(12) United States Patent
Mehrotra et al.

(10) Patent No.: US 9,286,225 B2
(45) Date of Patent: Mar. 15, 2016

(54) FLASH-BASED STORAGE SYSTEM INCLUDING RECONFIGURABLE CIRCUITRY

(71) Applicant: Saratoga Speed, Inc., San Jose, CA (US)

(72) Inventors: Sharad Mehrotra, Saratoga, CA (US); Jack Mills, San Carlos, CA (US); Thomas Gourley, Banks, OR (US); Jon Livesey, San Jose, CA (US)

(73) Assignee: Saratoga Speed, Inc., San Jose, CA (US)

( * ) Notice: Subject to any disclaimer, the term of this patent is extended or adjusted under 35 U.S.C. 154(b) by 156 days.

(21) Appl. No.: 13/931,650

(22) Filed: Jun. 28, 2013

(65) Prior Publication Data

US 2014/0281153 A1    Sep. 18, 2014

Related U.S. Application Data

(63) Continuation-in-part of application No. 13/844,663, filed on Mar. 15, 2013.

(51) Int. Cl.
*G06F 12/00* (2006.01)
*G06F 12/08* (2006.01)

(52) U.S. Cl.
CPC .................... *G06F 12/0866* (2013.01)

(58) Field of Classification Search
None
See application file for complete search history.

(56) References Cited

U.S. PATENT DOCUMENTS

| | | | |
|---|---|---|---|
| 6,032,232 A | 2/2000 | Lindeborg et al. | |
| 2003/0084248 A1* | 5/2003 | Gaither et al. | 711/133 |
| 2006/0242354 A1* | 10/2006 | Johnsen | G06F 13/404 710/316 |
| 2007/0156966 A1* | 7/2007 | Sundarrajan et al. | 711/133 |
| 2008/0244189 A1 | 10/2008 | Allison et al. | |
| 2009/0164700 A1* | 6/2009 | Chen et al. | 711/103 |
| 2010/0241807 A1* | 9/2010 | Wu et al. | 711/118 |
| 2012/0023282 A1 | 1/2012 | Rub | |
| 2012/0079199 A1* | 3/2012 | Beardsley et al. | 711/118 |
| 2012/0093078 A1 | 4/2012 | Perlman et al. | |
| 2013/0022201 A1 | 1/2013 | Glew et al. | |
| 2013/0138911 A1 | 5/2013 | Gopalakrishnan et al. | |
| 2013/0212431 A1 | 8/2013 | Ong | |
| 2013/0311706 A1 | 11/2013 | Okada, Naoya et al. | |
| 2014/0095785 A1* | 4/2014 | Nataraj | 711/108 |
| 2014/0281140 A1 | 9/2014 | Mehrotra et al. | |
| 2014/0281169 A1 | 9/2014 | Mehrotra et al. | |

OTHER PUBLICATIONS

"U.S. Appl. No. 13/844,663, Non Final Office Action mailed Dec. 24, 2014", 8 pgs.
"ExpressFabric(r) PCI Express as a Converged, Rack-Level Interconnect", PLX Technology (May 2013), 1-16.
(Continued)

*Primary Examiner* — Kevin Verbrugge
*Assistant Examiner* — Craig Goldschmidt
(74) *Attorney, Agent, or Firm* — Schwegman Lundberg & Woessner, P.A.

(57) ABSTRACT

Apparatus and method for accelerating processing operations of flash based storage systems are disclosed herein. In some embodiments, an IC component disposed between I/O circuitry and flash storage devices is configured to optimize fulfillment of data read and write requests originating from a network or device external to the flash based storage system using cache memory before involving the flash storage devices.

18 Claims, 17 Drawing Sheets

(56) References Cited

OTHER PUBLICATIONS

"HP Moonshot System", Family Data Sheet (c) 2013 Hewlett-Packard Development Company, (Apr. 2013), 8 pgs.

"HP Moonshot System—Technical White Paper", (c) 2013 Hewlett-Packard Development Company, (2013), 1-8.

"HP Moonshot: An Accelerator for Hyperscale Workloads", (c) 2013 Moor Insights & Strategy, (2013), 9 pgs.

"Juniper Networks QFabric: Scaling for the Modern Data Center", (c) 2011 ACG Research, (2011), 1-9.

"Non-Transparent Bridging Simplied—Multi-Host System and Intelligent I/O Design with PCI Express", (c) 2004 PLX Technology, Inc., (2004), 4 pgs.

"Product Overview—Brief Overview of the Product Families & Applications", PLX Technology, (May 2013), 1-46.

"QFabric tm System", (c) 2013 Juniper Networks, Inc., (Jun. 2013), 12 pgs.

"Technology Brief PCI Express", PLX Technology, (2003), 5 pgs.

"The data center of tomorrow: How disruptive will new technologies be?", (c) 2013 Goldman Sachs, (Apr. 10, 2013), 1-34.

"White Paper: Egenera Cloud Suite", (c) 2013 Egenera Inc., (2013), 8 pgs.

Blake, Bob, "Choosing the Right Programmable Logic Solution for PCI Express Applications", [online]. Retrieved from the Internet: <URL: http://www.rtcmagazine.com/articles/view/100327>, (Apr. 2005), 1-7.

Budruk, Ravi, "PCI Express(r) Basics", (c) 2007, PCI-SIG, (2007), 40 pgs.

Hutchinson, Lee, "The SSD Revolution / An ARS Technica Feature", Solid-state revolution: in-depth on how SSDs really work, (Jun. 4, 2012), 1-27.

Morgan, Timothy P., "Til heftier engines come aboard, HP Moonshot only about clouds", [online]. [retrieved on Apr. 9, 2013]. Retrieved from the Internet: <URL: http://www.theregister.co.uk/2013/04/09/hp_moonshot_server_analysis/>, (Apr. 9, 2013), 1-8.

Myslewski, Rik, "HP wants to help you mount a Moonshot", [online]. [retrieved on Nov. 3, 2013]. Retrieved from the Internet: <URL: http://www.theregister.co.uk/2013/11/02/hp_pathfinder_innovation_ecosystem_and_discovery_lab/>, (2013), 3 pgs.

Regula, Jack, "Using Non-transpatent Bridging in PCI Express Systems", PLX Technology, Inc., (Jun. 1, 2004), 1-31.

Vahdat, Amin, "The Emerging Optical Data Center", OSA/OFC/NFOEC 2011, (2011), 3 pgs.

"U.S. Appl. No. 13/844,663, Response filed Apr. 24, 2015 to Non Final Office Action mailed Dec. 24, 2014", 13 pgs.

U.S. Appl. No. 13/844,663, Notice of Allowance mailed Jul. 6, 2015, 7 pgs.

U.S. Appl. No. 13/958,310, Non Final Office Action mailed Jul. 17, 2015, 14 pgs.

U.S. Appl. No. 14/189,275, Non Final Office Action mailed Jul. 16, 2015, 14 pgs.

\* cited by examiner

|  |  |  | 700 |  |
|--|--|--|--|--|
| 702 | | 704 | | 706 |
| TRACKING METRICS | | CACHE TAGS | | CACHE LINES |
| | · · · | $T_A$ | | $D_A$ |
| | | $T_B$ | | $D_B$ |
| | | $T_C$ | | $D_C$ |
| | | ⋮ | | ⋮ |

FIG. 7A

FLASH-BASED STORAGE SYSTEM INCLUDING RECONFIGURABLE CIRCUITRY

CROSS-REFERENCE TO RELATED APPLICATIONS

This application is a continuation-in-part of U.S. patent application Ser. No. 13/844,663 filed Mar. 15, 2013, the content of which is incorporated herein by reference in its entirety.

TECHNICAL FIELD

The present disclosure relates generally to networked storage systems, and more particularly, in some embodiments, to subsystems for facilitating data storage and access in flash based networked storage systems.

BACKGROUND

The large amounts of information generated daily challenge data handling facilities as never before. In the context of today's information generation, data is being generated at rates perhaps thousands or tens of thousands of times greater than was the data-generation rate in the 1990s. Historically, large volumes of data sparked explosive growth in data communications. Responses to growing amounts of data generation centered on improving the movement of data based in increased transmission data rates to enhance throughput in communication channels. For instance, transmission pipelines grew from a few tens of megabits-per-second (Mb/s) transmission rates to several tens of gigabits-per-second (Gb/s) rates during the 1990s.

In the same period, typical storage devices, such as hard disk drives (HDDs), when amassed in sufficient numbers, might accommodate large volumes of data, but the rates at which data may be stored and retrieved have not scaled at the same rate as the volume of data stored on the devices has increased. Data access rates for HDDs are at similar orders of magnitude today as they were in the 1990s.

Fundamental storage subsystems have not integrated technology to enable scaling of effective data storage at the same rate that data generation is growing. Hence the challenge to systems handling large volumes of data is not likely to be alleviated by the combination of contemporary HDD technology with high-speed data transmission channels. In order to handle and manage big data, information processing facilities will be pressured to utilize larger volumes of storage with higher performance rates for capturing and accessing data.

BRIEF DESCRIPTION OF THE DRAWINGS

Some embodiments are illustrated by way of example and not limitation in the figures of the accompanying drawings in which:

FIG. 7A illustrates an example cache table maintained in each of the tags and matching logic modules connected to respective FPGAs according to some embodiments.

DETAILED DESCRIPTION

Figure 1:
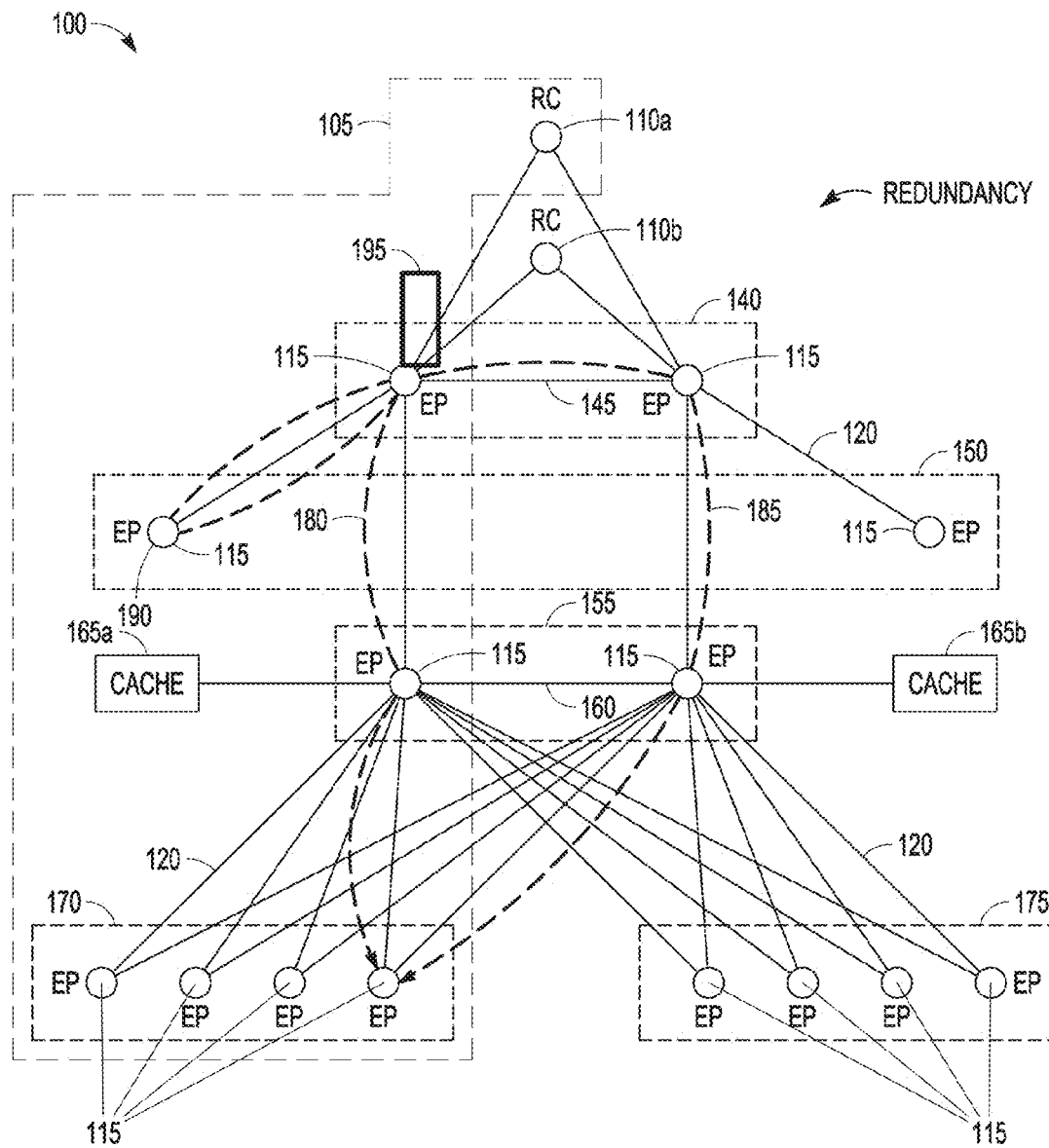
FIG. 1 is a diagrammatic representation of a hierarchical interconnection fabric including redundant paths, as may be used in example embodiments.

Described in detail herein is an apparatus, method, and article of manufacture for accelerating operations of a flash-based storage system using an integrated circuit hardware component interposed between the I/O circuits and flash memory of the flash-based storage system. In some embodiments, at least a portion of the integrated circuit hardware component comprises reconfigurable circuitry. As an example, the integrated circuit hardware component comprises a FPGA. The integrated circuit hardware component includes one or more of a reconfigurable application engine, a cache management subsystem, a behavior control, a RAID compute engine, and a protocol offload engine.

The reconfigurable application engine comprises reconfigurable circuitry hardware configured to run an application, algorithm, or other processor-intensive operations offloaded by a server/CPU included in the flash-based storage system. The offloaded processor-intensive operation may pertain to operation of the flash-based storage system itself or may be requested by an external network connected to the flash-based storage system. The cache management subsystem includes a cache control, cache modules, and a tags and matching logic module (the cache modules and tags and matching logic module coupled to and external to the integrated circuit hardware component). The cache control optimizes use of the cache modules to initially source and store data requested by I/O requests originating from the external network rather than relying on the flash memory as the initial/first source. The behavior control is configured to perform higher level monitoring of certain combination of behaviors, attributes, characteristics, or events occurring in the flash-based storage system. The RAID compute engine is configured to facilitate redundant grouping of the flash memory to improve chances of data recovery in failure scenarios. The protocol offload engine is configured to process read and write requests offloaded from the server/CPU included in the flash-based storage system. The cache modules and tags and matching logic module are used by the protocol offload engine to supply or add data identified in the offloaded read and write requests.

Various modifications to the example embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that the invention may be practiced without the use of these specific details. In other instances, well-known structures and processes are not shown in block diagram form in order not to obscure the description of the invention with unnecessary detail. Thus, the present disclosure is not intended to be limited to the embodiments shown, but is to be accorded the widest scope consistent with the principles and features disclosed herein.

Environment

Much of the drawback of current storage subsystems has to do with limitations created by bottlenecks in data transport bandwidth inherent in the storage devices themselves. For example, disk drives have significant limitations in latency, seek times, and data transfer rates, which for the purposes of this application these quantities will be cumulatively referred to as the "access time." The total amount of storage that may be provided by HDD may approximate the expectations of storage capacities required by big data users, but the ability to provide high performance data throughput at those storage capacities is limited by the use of HDD technology and the inherent data access limitations.

Although HDD devices can store large quantities of data with high reliability, typical HDD devices lack access speeds high enough to directly service the storage requirements of client devices having high data rate requirements. When high-performance network data transmission technologies are coupled to a large capacity storage subsystems based on HDD memory, there is a performance mismatch between the data rates sustainable by the network attached devices and the HDDs that caching alone does not remedy to fulfill the performance levels required by big data.

Redundant Paths

FIG. 1 is a diagrammatic representation of a hierarchical interconnection fabric 100 including redundant paths, as may be used in example embodiments. A fabric is composed of point-to-point links that interconnect a set of components. According to example embodiments, a single or first fabric instance 105 can refer to a hierarchy including one or more root complexes RC 110 (e.g., RC 110a, RC 11b) and one or more endpoints EP 115 interconnected with point-to-point links 120.

Redundant paths may be created by coupling crossover paths from point-to-point links 120 between two fabric instances such that some or all of the first fabric instance 105 may be coupled to some or all of a second fabric instance 125. In this way, components at endpoints and/or root complexes associated with the first fabric instance 105 may conduct transactions with components associated with endpoints 115 and/or further root complexes 110 associated with the second fabric instance 125 even though certain point-to-point links 120, endpoints, and root complexes 110 may become unavailable due to failure or transaction congestion.

In continuing accord with example embodiments, the root complex 110 can denote the root of an interconnected input/output (I/O) hierarchy that connects a central processing unit (CPU) and a local memory to I/O components coupled by the interconnection fabric. A root complex 110 may support transactions to or from one or more ports where each port defines an interface to a portion of the hierarchical interconnect fabric. Accordingly, one or more root complexes RC 110 may have redundant connections to a first set of endpoints 140, which are coupled to each other through a first crossover path 145. The first set of endpoints 140 can be coupled to a second set of endpoints 150 and a third set of endpoints 155. The third set of endpoints 155 is coupled to one another by a second crossover path 160, as well as to one or more cache modules 165a,b containing cache memory. The third set of endpoints 155 can also be coupled to a fourth set of endpoints 170 and a fifth set of endpoints 175.

According to certain example embodiments, an interconnection scheme is based on the hierarchical interconnection fabric 100 can interconnect components or devices, such as a cache module 165a or 165b, for example, with further devices (not shown) as endpoints of each connection. An endpoint can be a type of device that may be a requester or completer of a transaction within the interconnection scheme. According to the placement of point-to-point links 120 and the interconnection of certain types of endpoints, a hierarchy of component connections may be established at the endpoints.

For example, the second set of endpoints 150 may be I/O circuits that can be connected to external networks and the third set of endpoints 155 may be reconfigurable data transfer circuits. The first set of endpoints 140 may be connection points establishing connections for transactions between I/O circuits associated with the second set of endpoints 150 and the reconfigurable data transfer circuits of the third set of endpoints 155. By maintaining certain types of components at certain levels of endpoint groupings, a hierarchy of endpoints may be established. By way of further example, the fourth set of endpoints 170 and the fifth set of endpoints 175 may be storage devices, that when coupled to the third set of endpoints, form a storage tier at a further level of an endpoint hierarchy.

The first crossover path 145 provides a redundant path capability between endpoints in the second set of endpoints 150 and the fourth set of endpoints 170. For instance, a first endpoint 190 in the second set of endpoints 150 may connect through a first redundant path 180 to a completer endpoint in the fourth set of endpoints 170. Alternately, the first endpoint 190 in the second set of endpoints 150 may alternatively connect to a second redundant path 185 to the same completer endpoint in the fourth set of endpoints 170 as was the case for the first redundant path 180. By utilizing the first crossover path 145 to couple the first and second endpoints in the first set of endpoints 140 the second redundant path 185 couples between the second endpoint of the first set of endpoints 140 and the second endpoint of the third set of endpoints 155 to complete a connection to the completer endpoint in the fourth set of endpoints 170.

The second redundant path 185 may be utilized in the case, for example, that the first endpoint in the third set of endpoints 155 becomes unavailable due to either a component failure or perhaps from congestion due to high volumes of data stemming from a previous transaction. By a simple application of symmetry, the first redundant path 180 and the second redundant path 185 may be considered rotated or reflected about a vertical axis down the center of the figure (not shown) such that the second endpoint in the second set of endpoints 150 and a first (completer) endpoint in the fifth set of endpoints 175 would be coupled to one another by either the mirrored first redundant path 180 or the mirrored second redundant path 185 (not shown). Application of this symmetric case of redundant paths would provide a coupling of the second endpoint in the second set of endpoints 150 to the completer endpoint in the fifth set of endpoints 175 in the event that the second endpoint in the third set of endpoints 155 were to become unavailable.

A similar situation for providing redundant paths may be visualized by applying the second crossover path 160 providing alternative connections between the first endpoint 190 in the second set of endpoints 150 to a completer endpoint in the fifth set of endpoints 175. The second crossover path 160 would alternatively provide a path for coupling the first endpoint in the fifth set of endpoints 175 through either of the endpoints in the third set of endpoints 155. By application of alternate path connections, similar to that described above for the first redundant path 180 and the second redundant path 185, a similar pair of redundant paths would support the coupling the first endpoint 190 in the second set of endpoints 150 to the first endpoint in the fifth set of endpoints 175.

These redundant paths also allow for data to be routed to or from any root complex 110 to any endpoint or cache memory module even if there is a path or endpoint that, for example, becomes unavailable due to a component failure or congestion. For instance, if the first endpoint in the first set of endpoints 140 becomes unavailable, the first root complex 110a may take advantage of an alternate point-to-point link 120 to the second endpoint in the first set of endpoints 140 and gain access to either the fourth set of endpoints 170 or the fifth set of endpoints 175 through use of either of the endpoints in the third set of endpoints 155 and the second crossover path 160 in a fashion similar to that described above in regard to the first redundant path 180 and the second redundant path 185. In addition, if a first path from an endpoint to a further endpoint or from a root complex to any endpoint is operating at a full capacity, a redundant path may be incorporated in order to boost performance by balancing the load between interconnection fabrics.

Figure 10:
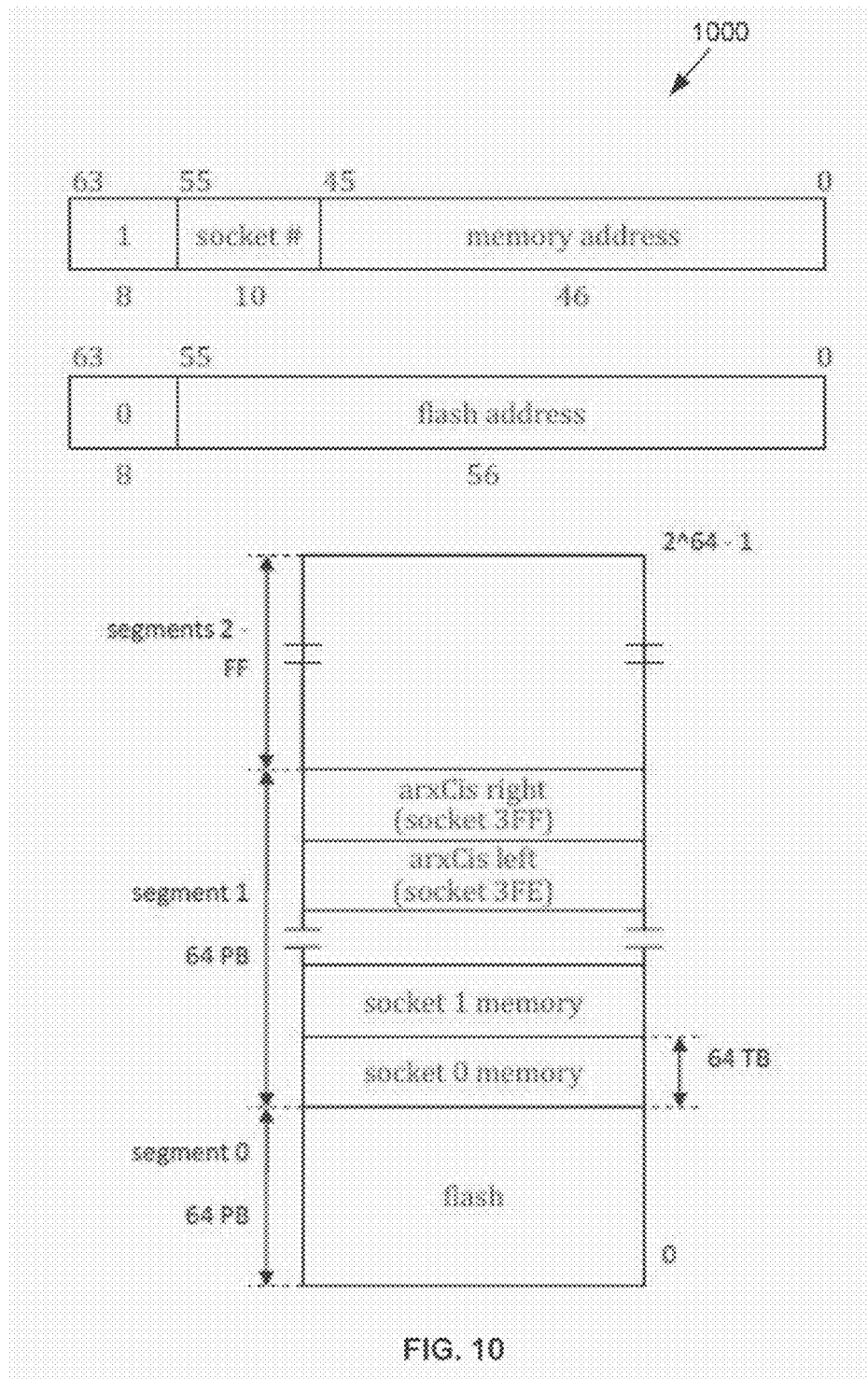
FIG. 10 illustrates a peer-to-peer address configuration space, as may be used in example embodiments.

Various groupings of endpoints have been described as forming a hierarchy within the interconnection fabric. Enumeration is a process initiated by a master processor or server to set up a description of a tree hierarchy corresponding to the interconnection fabric. The enumeration process may start from the tree root (root complex) and progress down to the leaf nodes of the interconnection fabric. According to some example embodiments, a serial communication and connection specification or a serial bus standard such as the peripheral component interconnect express (PCIe) a configuration process may be implemented as boot software is executed to discover endpoints and assign identifiers to discovered endpoints using a depth-first sequence. Once discovered, these endpoints can be configured along with further PCIe components, such as fabric switches and field programmable gate arrays (FPGAs) (not shown), and associated cache modules 165a,b; so that packets can be routed per the enumerated identifiers as well as the address map described below (FIG. 10). All levels of nodes or endpoints within the tree are named according to the level at which they reside. The enumerated hierarchy descriptors are stored in tables. Only the root complexes RC 110 have a map of the tree hierarchy. The identities of data packets may be translated from the TCP/IP space to this address naming space of the interconnection fabric (e.g., PCIe address configuration space).

A further component of redundancy in accordance with some embodiments is the use of a mechanism known as a "nontransparent bridge" (NTB) 195. The NTB 195 allows packets of data to traverse from the tree of one interconnection fabric to another tree in a parallel interconnection fabric. NTB 195 includes registers that map the address space of one tree to the address space of another tree, and translates relevant fields in packets as they traverse from one tree to another. Since each CPU die typically has its own root complex and there can be multiple CPU dies in a subsystem, NTB 195 can be used to allow multiple CPU dies to connect to devices throughout the subsystem. The first root complex 110a and the second root complex 110b are coupled to inputs of the NTB 195 (not shown). An output of the NTB 195 is coupled to the first endpoint of the first set of endpoints 140.

According to example embodiments, the NTB 195 may be programmed to gate the second input coupled to the second root complex 110b in nominal operation. In the event of a CPU failure in the first root complex 110a in association with the first fabric instance 105, software running on a CPU in the second root complex 110b can re-configure the NTB 195 connection to become "transparent," thus making the previous nontransparent connection for the second root complex 110b to become viable for managing the routing of data packets through the first fabric instance 105. Any components in the first fabric instance 105 that were coupled to the first root complex 110a become part of the interconnection fabric managed by the second root complex 110b after reconfiguring the NTB 195.

Figure 2:
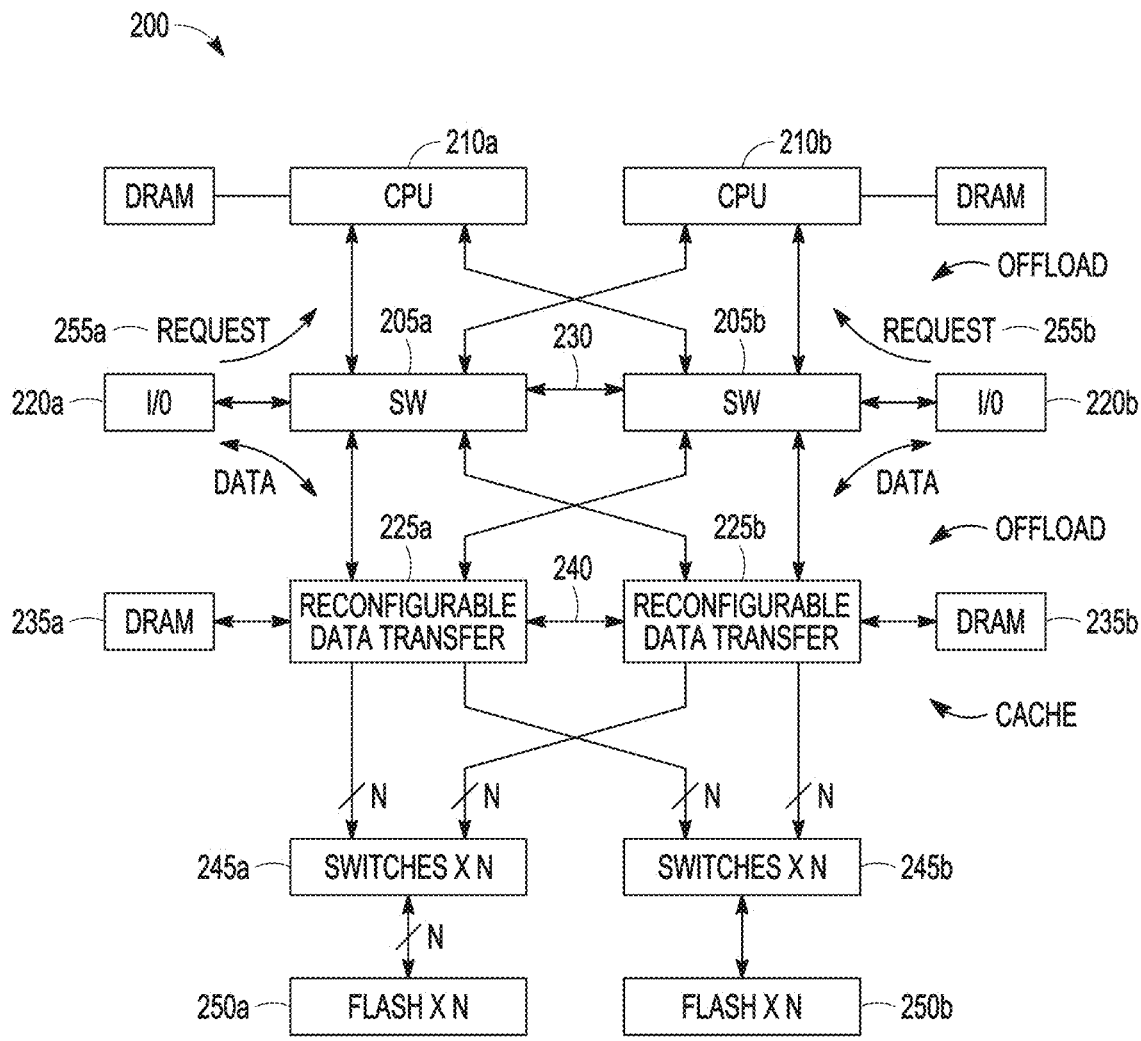
FIG. 2 is a diagrammatic architecture level representation of a storage system, according to example embodiments.

FIG. 2 is a diagrammatic architecture level representation of a storage system 200, according to example embodiments. This architecture level representation of a storage system corresponds to the hierarchical interconnection fabric of FIG. 1. Root complexes 210a,b (e.g., CPUs) are each coupled to a first set of switches SW 205a,b. The root complexes 210a,b can include one or more interconnection fabric ports or connection bridges, coupling to the interconnection fabric, starting with the first set of switches 205a,b. The interconnection fabric can include an array of switches assembled in a tree structure or similar array as outlined in FIG. 1 in regard to endpoints. The array of switches can connect endpoints to one another and to the root complexes 210a,b. Such an array of switches may also be referred to as a switch fabric.

According to some example embodiments, the switch 205a may comprise a bridge at an input port and have one or more outputs, each appearing as a further bridge connected to the bridge at the input. By incorporating this array of bridges, switches 205a,b can create multiple endpoints out of one endpoint and thus allow one endpoint to be shared with multiple devices.

An interconnection fabric can be configured with a peer-to-peer (P2P) connectivity scheme, according to example embodiments. Given the point-to-point nature of PCIe, switches are used to allow a single device to communicate with multiple devices. Switches route packets either by address or by destination identifier (described below). The switches within the switch fabric establish data communication paths between endpoints connected at the boundaries of the switch fabric in a manner similar to the connectivity description of endpoints in FIG. 1. This point-to-point communication between endpoints may be accomplished with a serial communication and connection specification or the PCIe standard as the management layer. PCIe is a high-speed serial computer expansion bus standard that implements improvements over predecessor connection standards, such as the peripheral component interconnect (PCI) standard or the accelerated graphics port (AGP) standard.

I/O circuits 220a,b can couple the switches 205a,b, respectively, to external networks or devices (not shown). The switches 205a,b may be coupled to reconfigurable data transfer components 225a,b as well as to one another. The coupling between the switches 205a,b may be provided by a first crossover path 230 similar to that described for the first set of endpoints 140 (FIG. 1). Each of the switches 205a,b couples to both reconfigurable data transfer components 225a,b. The first crossover path 230 and the cross coupling of the switches 205a,b to each of the two reconfigurable data transfer components 225a,b can establish the cross coupling and redundant paths, as well as the ensuing capabilities, as described above in relation to first set of endpoints 140 and the third set of endpoints 155 (FIG. 1).

The reconfigurable data transfer components 225a,b each couple to a respective dynamic random access memory (DRAM) 235a,b as well as to one another through a second crossover path 240. The reconfigurable data transfer components 225a,b are also each cross coupled to a first switch array 245a and a second switch array 245b. The cross coupling of the reconfigurable data transfer components 225a,b to one another and to the switch arrays 245a, b provides the redundant paths capabilities described above in FIG. 1. The first switch array 245a and the second switch array 245b are coupled to a first flash array 250a and a second flash array 250b, respectively.

One or more of the external networks may provide a transfer request to the I/O circuits 220a,b which, in turn, can be propagated to the root complexes 210a,b as requests 255a,b. The requests 255a,b are, in turn, propagated by the root complexes 210a,b to the switch fabric as respective data transfer requests. According to an example embodiment, a data transfer request made by the root complex can establish a point-to-point connection across the P2P switch fabric by establishing a path through particular switch elements in the fabric. The root complex may be involved in initiating a path through the switch fabric and thereafter data transfers from endpoint to endpoint may be conducted without direct intervention by the CPU in each data packet of the transfer. For example, a data sourcing endpoint such as the first I/O circuit 220a may be coupled to a data receiving endpoint such as the first flash array 250a by a transfer request initiated with the first root complex 210a. The transfer request initiated by the first root complex 210a may establish a memory mapped input-output (MMIO) connection between the two endpoints and thereafter large amounts of data may be transferred between the endpoints without further involvement by the first root complex 210a.

Figure 3:
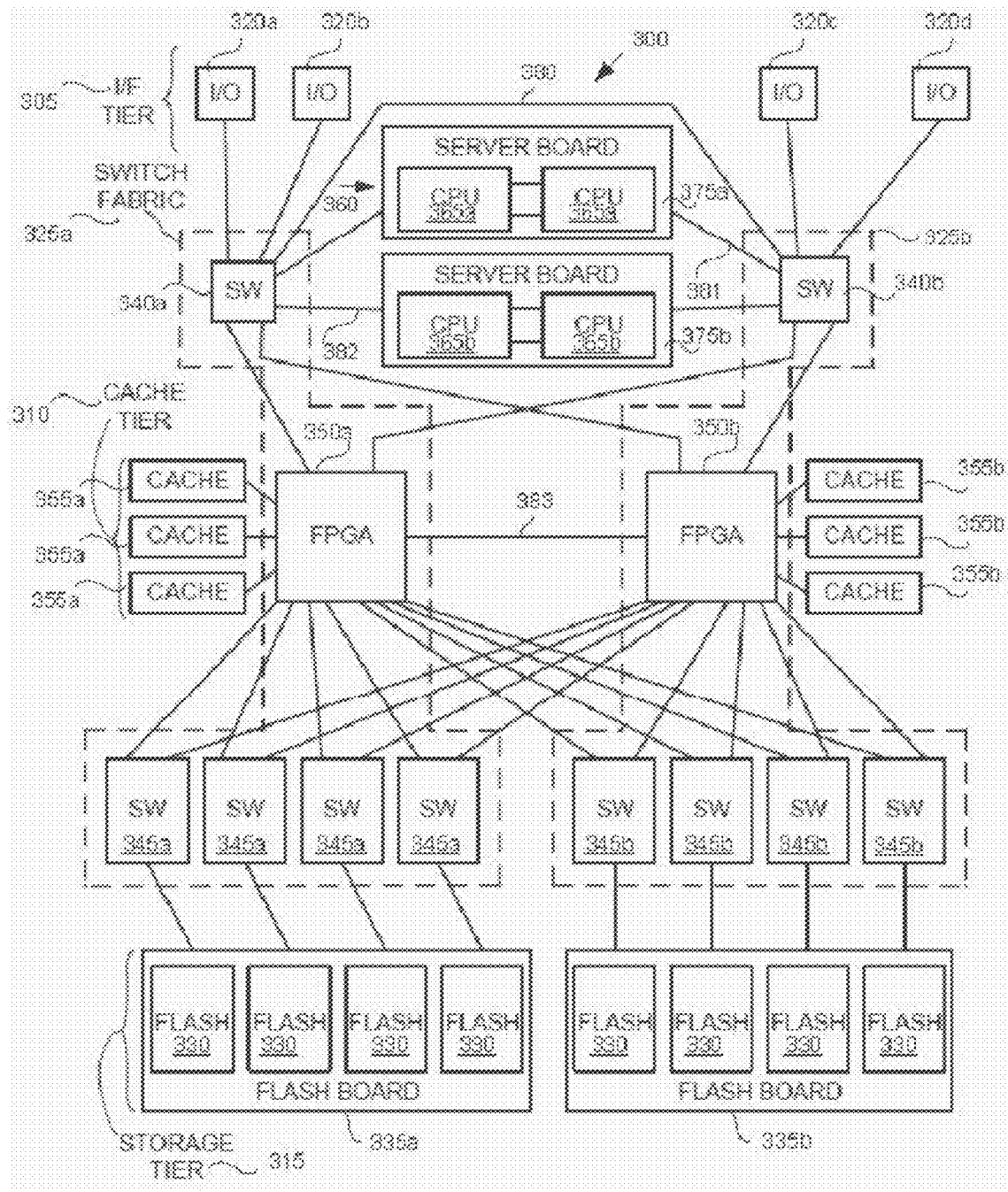
FIG. 3 is a block level representation of a storage system, according to example embodiments.

FIG. 3 is a block level representation of a storage system 300 in accordance with some embodiments. The architecture includes three tiers, namely a network interface tier 305 (also referred to as I/F tier 305), a cache tier 310, and a storage tier 315. Each of the three tiers can be coupled together by an interconnect layer.

Within the network interface tier 305, in certain embodiments, I/O circuits 320a,b,c,d (collectively referred to as I/O circuits 320) provide high-speed connections from external networks or devices (not shown) to an interconnect layer or switch fabrics 325a,b. I/O circuits 320a,b are coupled to switch fabric 325a, and I/O circuits 320c,d are coupled to switch fabric 325b. The I/O circuits 320 are also coupled to external networks (not shown), such as InfiniBand, Fibre Channel, serial attached SCSI (SAS), and/or Ethernet, for example. The I/O circuits 320 connect these external networks to switch fabrics 325a,b. The I/O circuits 320 can provide protocol conversion and still produce high-speed data communication between the external networks and the switch fabrics 325a,b.

The I/O circuits 320 may be coupled by the switch fabrics 325a,b to the cache tier 310 and/or the storage tier 315. The storage tier 315 may be composed of flash circuits or modules 330 arranged on flash boards 335a,b (collectively referred to as flash boards 335). The switch fabric 325a may be implemented with an array of switches, including I/O circuit switch 340a coupled to the I/O circuits 320a,b and flash switches 345a coupled to the flash board 335a. The switch fabric 325b may be implemented with an array of switches, including I/O circuit switch 340b coupled to the I/O circuits 320c,d and flash switches 345b coupled to the flash board 335b. The cache tier 310 can be implemented with reconfigurable circuitry. In some embodiments, the reconfigurable circuitry comprises field-programmable gate array (FPGA) 350a,b (collectively referred to as FPGA 350), which is interposed in the respective switch fabrics 325a,b to couple respective cache modules 355a,b to various endpoints under the command and direction of the FPGA 350a,b.

A server layer 360 may be, for example, server boards 375a,b (collectively referred to as server boards 375). The server layer 360, which is coupled to the switch fabrics 325a, b, includes CPUs or servers 365a,b within respective server boards 375a,b. The server boards 375, also referred to as root complexes, act as a control and management agent for respective portions of the switch fabrics 325a,b.

In some embodiments, each server 365a,b in the server layer 360 may be coupled to a respective switch fabric 325a,b. Each server and each respective switch fabric may be cross coupled to one another. A crossover path 381 comprises a redundant connection pathway between the server board 375a and the switch fabric 325b. A crossover path 382 comprises a redundant connection pathway between the server board 375b and the switch fabric 325a. The I/O circuit switches 340a,b within respective switch fabrics 325a,b can also be cross coupled to each other via a crossover path 380. A crossover path 383 couples the FPGA 350a,b to each other. Redundant paths, as described above with reference to FIG. 1, can provide access to a parallel or mirrored paths according to cross coupling between the switch fabrics 325a,b.

In redundant switch fabrics, such as the switch fabric 325a and the switch fabric 325b, there may be a server element (or "server") within the root complex associated with each portion of the redundant switch fabric. According to certain embodiments of redundant switch fabrics, two servers may be coupled to the switch fabric and reside on a server board and be directly coupled to one another by direct connections implemented on the server board. The direct connections between servers are primarily for communication and management considerations between the servers and additionally may operate as a cross-coupled transmission path for data throughput. Various elements within the switch fabric associated with respective servers may be connected to a corresponding element in the complementary (parallel) switch fabric and thus provide redundancy by establishing paths in another switch fabric when a portion of a path is not available in the first switch fabric. The crossover paths (e.g., crossover paths 380, 381, 382, and/or 383) may provide cross coupling as in similar elements described for FIGS. 1 and 2, to establish redundant pathways within the system 300.

The storage tier 315 can be composed of storage modules (e.g., memory elements) and implemented with flash memory or any persistent solid-state memory technology that provides data-access performance suitable for direct or speed buffered connection to data from external network environments. According to some embodiments, flash modules containing flash memory technology can be organized in the storage tier 315. Yet, the flash module connects to the switch fabrics 325a,b with a single connection and operates like a single-ended source and sink (receiver) of data. Flash module access times may also exceed the access performance of HDD technology by several decimal orders of magnitude.

The cache tier 310 can be positioned between the network interface tier 305 and the storage tier 315. The cache tier 310 can be connected through the switch fabrics 325a,b to both the I/O circuits 320 in the network interface tier 305 and the flash modules 330 in the storage tier 315. The cache tier 310 can be considered as an intermediate storage layer to temporarily store data that ultimately transitions from the I/O circuits 320 to flash modules 330 or vice versa. In certain embodiments, the cache tier 310 includes individual cache modules 355, each having DRAM for cache storage and flash memory for backup in case of power loss, for example.

Requests originating from I/O circuits 320a,b may be primarily serviced by switch fabric 325a, server board 375a, and cache modules 355a. Nevertheless, the redundant pathways built into the system 300, such as, but not limited to, crossover paths 380, 381, 382, and/or 383, permit other component(s) to take over in case of primary component failure, over capacity, or other inability to serve a given request. For example, if I/O circuit switch 340a is unable to handle a request from I/O circuit 320a or 320b, then I/O circuit switch 340b can take over via the crossover path 380. Requests originating from I/O circuits 320c,d may be primarily serviced by switch fabric 325b, server board 375b, and cache modules 355b. Similarly, the redundant pathways built into the system 300, such as, but not limited to, crossover paths 380, 381, 382, and/or 383, permit other component(s) to take over in case of primary component failure, over capacity, or other inability to serve a given request.

In alternative embodiments, one or more of the crossover paths 380, 381, 382, 383 may be omitted from the storage system 300 depending on extent of redundancy desired for the system.

Reconfigurable Circuitry

Figure 4A:
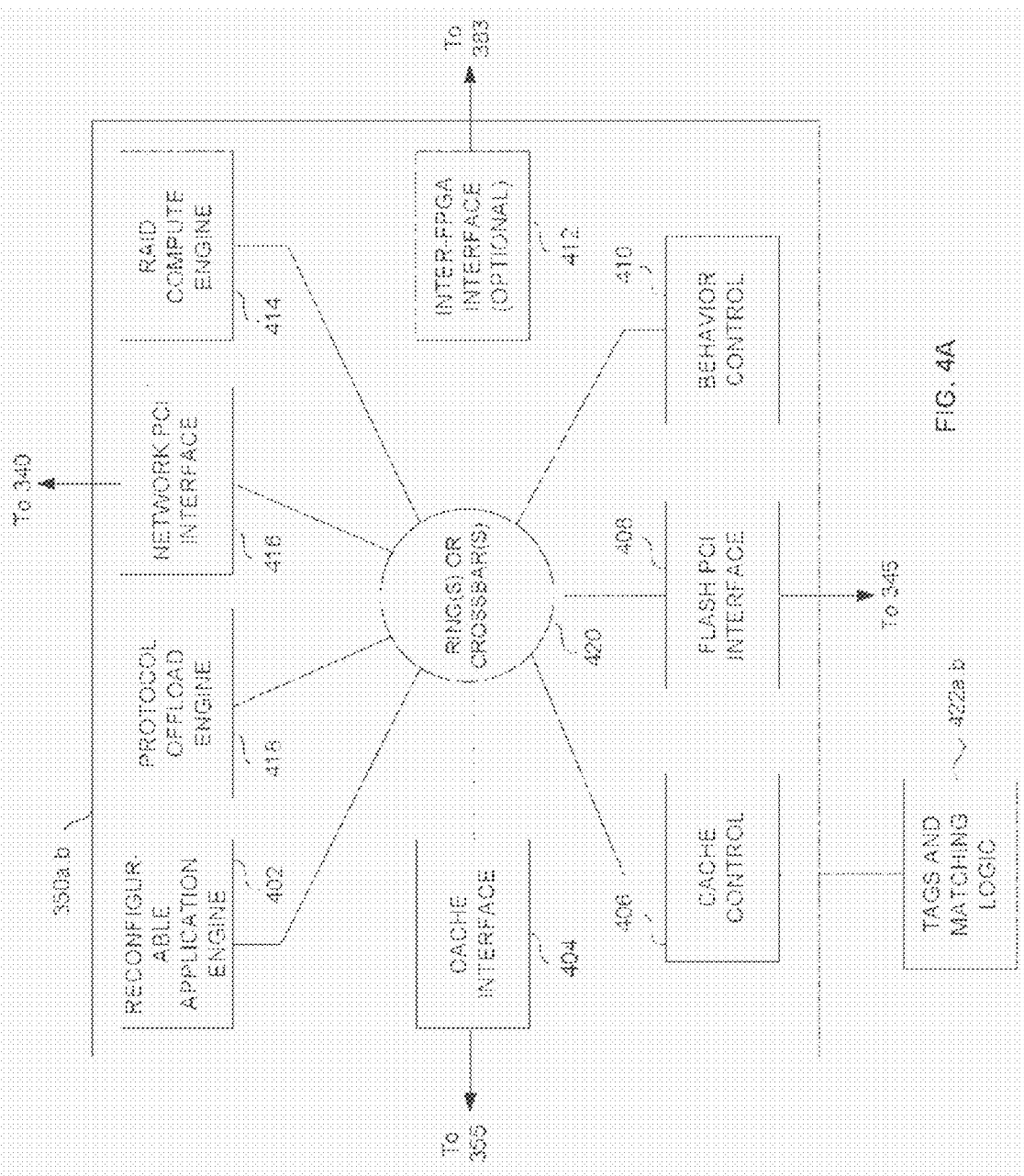
FIGS. 4A-4B illustrate additional details of each of the FPGAs included in the storage system according to some embodiments.
Figure 4B:
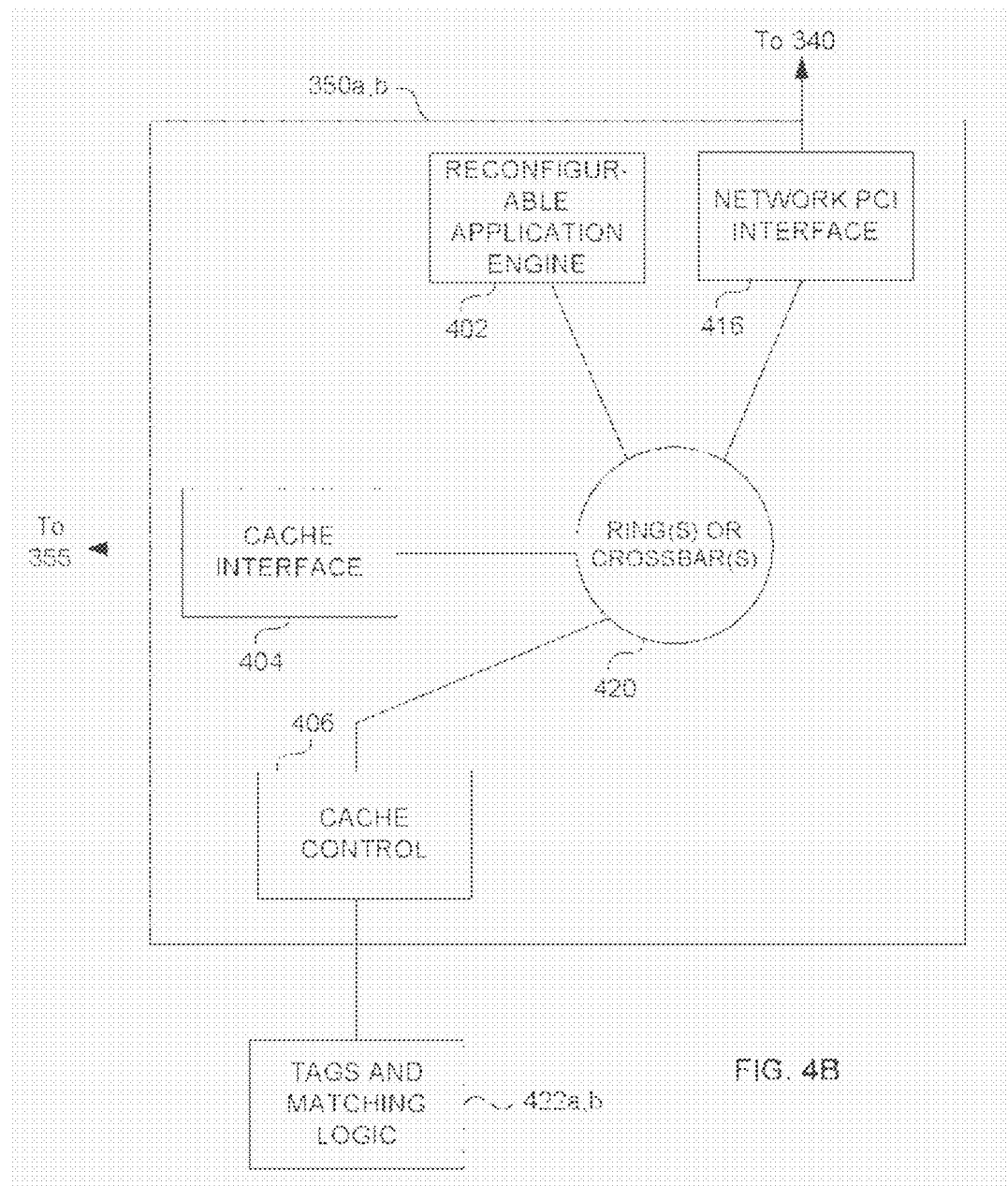

FIGS. 4A-4B illustrate additional details of each of the FPGA 350 included in the storage system 300 according to some embodiments. One embodiment of the FPGA 350 architecture is shown in FIG. 4A. The FPGA 350 (FPGA 350a,b) comprises each of a reconfigurable application engine 402, a cache interface 404, a cache control 406, a flash PCI interface 408, a behavior control 410, an inter-FPGA interface 412, a redundant array of independent disks (RAID) compute engine 414, a network PCI interface 416, and a protocol offload engine 418 coupled to ring(s) or crossbar(s) 420 also included in the FPGA 350. The cache interface 404 couples to the cache modules 355. The flash PCI interface 408 communicates with the flash board 335 via the flash switches 345. The inter-FPGA interface 412 couples to the crossover path 383 to facilitate communication with the other FPGA 350 of the system 300. The inter-FPGA interface 412 may be optional if the crossover path 383 is omitted from the system 300. The network PCI interface 416 communicates with the I/O circuits 320 and server boards 375 via the I/O circuit switches 340. The cache control 406 couples to a tags and matching logic module 422a,b located external to the FPGA 350a,b respectively. In some embodiments, each of the tags and matching logic module 422a,b comprises a ternary content addressable memory (TCAM).

Each of the reconfigurable application engine 402, cache interface 404, cache control 406, flash PCI interface 408, behavior control 410, inter-FPGA interface 412, RAID compute engine 414, network PCI interface 416, protocol offload engine 418, and ring(s) or crossbar(s) 420 comprises circuitry (and logic in some instances) specifically configured to perform functionalities and operations as described in detail below. The circuitry may comprise, for example, a plurality of logic components (also referred to as logic blocks), interconnects, memory elements (e.g., flip-flops or memory blocks), CPUs, and other circuit elements. All or just a portion of the FPGA 350 may be reconfigurable circuitry/hardware. For example, the reconfigurable application engine 402, cache control 406, and/or behavior control 410 may be reconfigurable circuitry/hardware while the other components of the FPGA 350 comprise non-reconfigurable circuitry/hardware. The FPGA 350 may comprise an application specific integrated circuit (ASIC) or an integrated circuit (IC) component in general.

Although not shown, the FPGA 350 may include additional memory, CPU, and/or processors to facilitate functionalities and operations of any of the reconfigurable application engine 402, cache interface 404, cache control 406, flash PCI interface 408, behavior control 410, inter-FPGA interface 412, RAID compute engine 414, network PCI interface 416, protocol offload engine 418, and/or ring(s) or crossbar(s) 420.

FIG. 4B illustrates an alternative embodiment of the FPGA 350 that is simpler than the FPGA 350 shown in FIG. 4A. In FIG. 4B, the FPGA 350 comprises each of the reconfigurable application engine 402, the cache interface 404, the cache control 406, and the network PCI interface 416 coupled to the ring(s) or crossbar(s) 420 also included in the FPGA 350. The couplings and communications pertaining to these components are similar to those discussed above for FIG. 4A.

Figure 5:
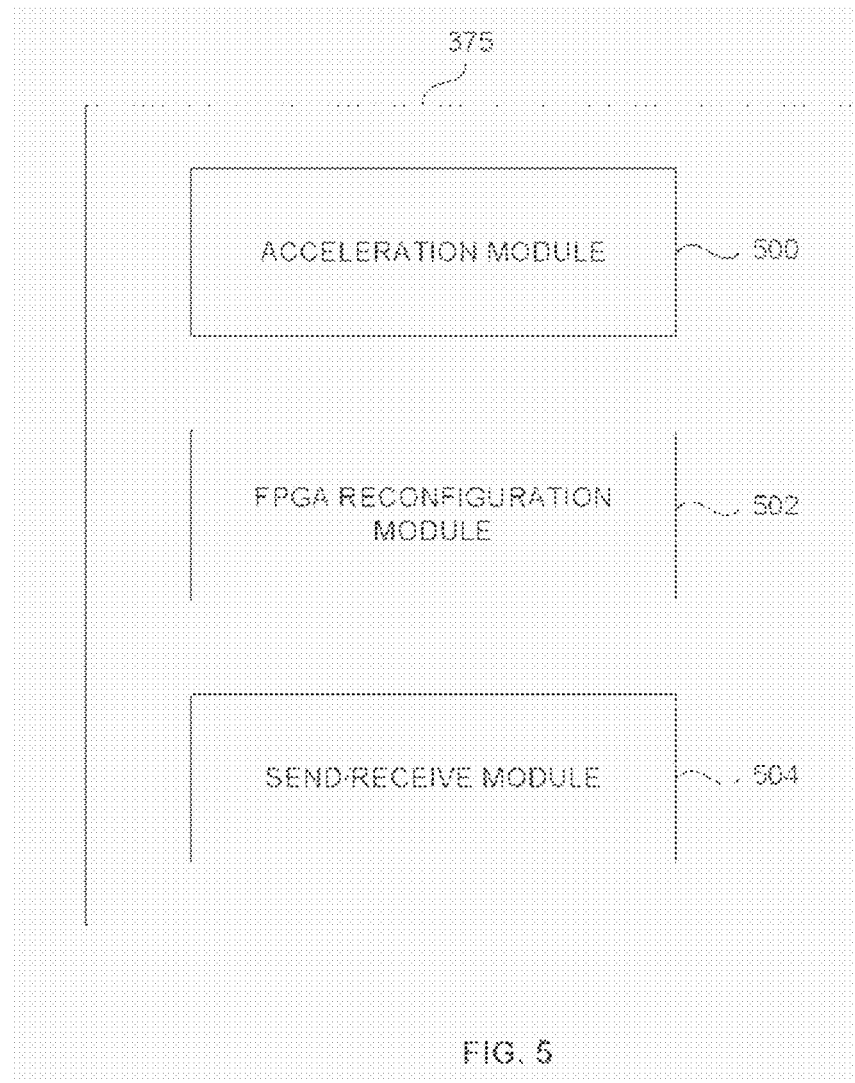
FIG. 5 illustrates an example block diagram showing functionalities/operations implemented in modules according to some embodiments.
Figure 6:
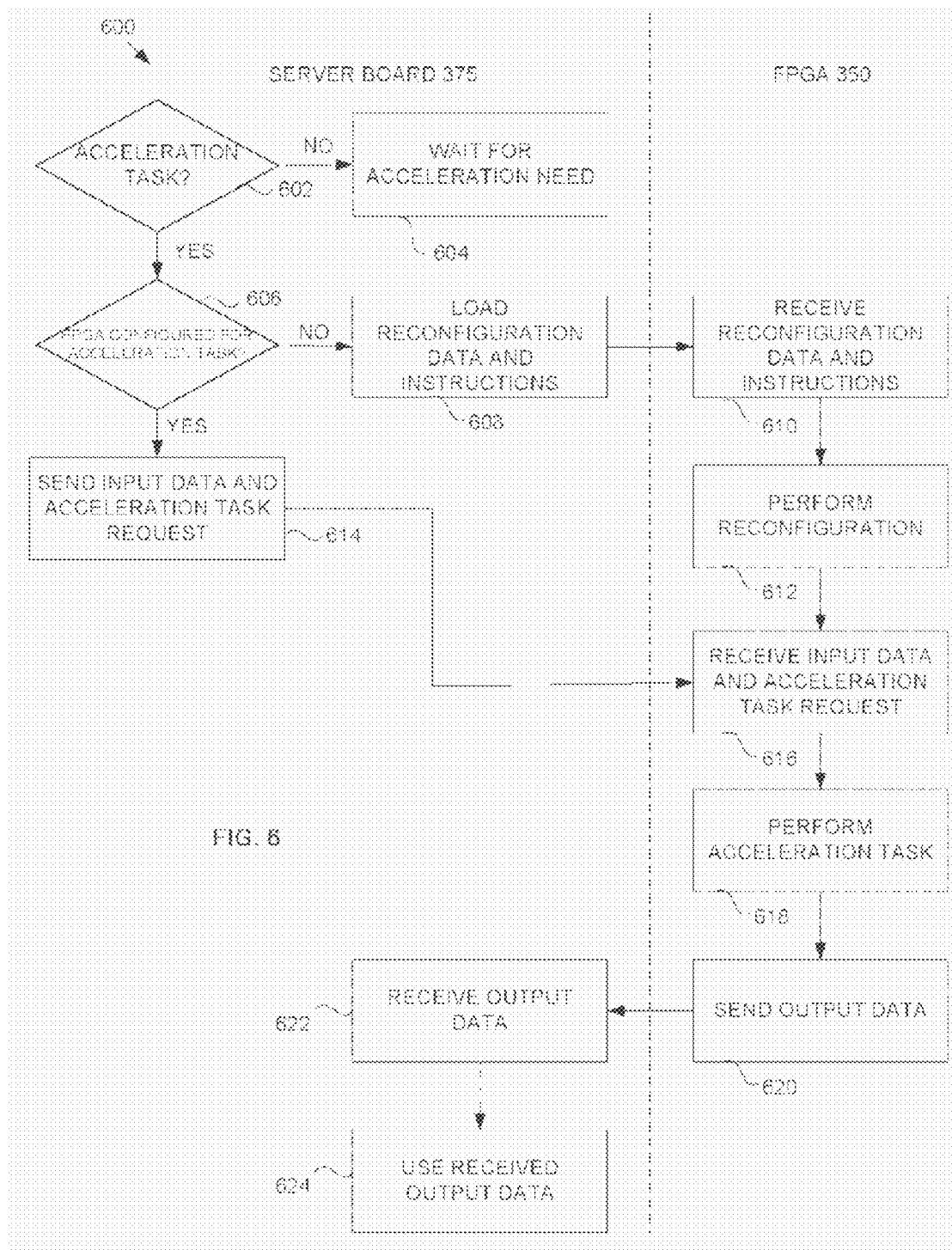
FIG. 6 illustrates an example flow diagram for the server board included in storage system to offload certain processing operations to a reconfigurable application engine of the FPGA according to some embodiments.

Additional details pertaining to the reconfigurable application engine 402 of the FPGA 350 are described in conjunction with FIGS. 5 and 6 according to some embodiments. FIG. 5 illustrates an example block diagram showing functionalities/operations implemented in modules according to some embodiments. The modules comprise one or more software components, programs, applications, apps, or other units of code base or instructions configured to be executed by one or more processors included in the server board 375. The modules include an acceleration module 500, a FPGA reconfiguration module 502, and a send/receive module 504. Although modules 500-504 are shown as distinct modules in FIG. 5, it should be understood that modules 500-504 may be implemented as fewer or more modules than illustrated. It should also be understood that any of modules 500-504 may communicate with one or more components included in the system 300 to obtain data or other information in connection with the reconfigurable application engine 402 performing processing functions that would otherwise be performed on the server board 375.

FIG. 6 illustrates an example flow diagram 600 for the server board 375 to offload certain processing operations to the reconfigurable application engine 402 of the FPGA 350, for the server board 375 to (re)configure the reconfigurable application engine 402 to perform the offloaded processing operations, and for the reconfigurable application engine 402 to perform the offloaded processing operations according to some embodiments. Blocks 602-608, 614, and 622-624 of FIG. 6 are performed on the server board 375. Blocks 610-612 and 616-620 of FIG. 6 are performed on the reconfigurable application engine 402.

The reconfigurable application engine 402 comprises reconfigurable circuitry/hardware that can be (re)configured under control of the server board 375. Certain processing functions or operations that may be performed via software implementation at the server board 375 may be offloaded to the reconfigurable application engine 402. The reconfigurable application engine 402 performs the offloaded processing functions/operations using hardware at a significantly faster speed than can be performed by software. Thus, the reconfigurable application engine 402 accelerates certain functions/operations that would otherwise be performed on the server board 375.

At a block 602, the acceleration module 500 determines whether a particular processing function or operation to be performed on the server board 375 is a function/operation that is suitable for offloading to the reconfigurable application engine 402. Whether the particular processing function/operation to be performed comprises a suitable acceleration task for the reconfigurable application engine 402 may depend on whether the reconfigurable application engine 402 is already configured to perform the particular processing function/operation, or it is a processing function/operation that is sufficiently processing or time intensive enough to warrant offloading to the reconfigurable application engine 402. Examples of suitable acceleration tasks include, but are not limited to, data compression, data decompression, de-duplication, snapshots, thin provisioning, encryption, decryption, a particular algorithm or subroutine or application, or a processing or time intensive function/operation pertaining to data access or storage within the system 300. Other examples of suitable acceleration tasks include, but are not limited to, performance of operations that are requested over a network pertaining to "big data" applications other than storage. Image processing, for example, are processor intensive and if there are a large number of images that require similar image processing/treatment, then the network may request the reconfigurable application engine 402 to be configured as an additional resource to perform a particular image processing task.

If the acceleration module 500 determines that the particular processing function/operation is not a suitable acceleration task (no branch of block 602), then the acceleration module 604 continues to wait for a suitable acceleration task (block 604). Otherwise the particular processing function/operation comprises a suitable acceleration task for the FPGA 350 (yes branch of block 602), and the FPGA reconfiguration module 502 checks whether the reconfigurable application engine 402 is configured for the acceleration task (block 606).

If the reconfigurable application engine 402 requires reconfiguration to handle the acceleration task (no branch of block 606), then the FPGA reconfiguration module 502 performs tasks to initiate reconfiguration of at least the reconfigurable application engine 402. The FPGA reconfiguration module 502 communicates with a configuration data source, control logic, confirms that the reconfigurable application engine 402 is ready for the reconfiguration data, and other initialization steps. At a block 608, the FPGA reconfiguration module 502 and/or the send/receive module 504 loads reconfiguration data and instructions to the FPGA 350, in order to reconfigure the reconfigurable application engine 402 circuitry to perform the particular acceleration task. In some embodiments, a hardware description language (HDL) can be used to specify the reconfiguration. Block 608 may be performed at system initialization (e.g., power up or reset of the system 300) and/or on-the-fly during normal system operation.

The reconfiguration data and instructions are received, at a block 610, at the FPGA 350 via I/O circuit switch 340. Next at a block 612, at least the reconfigurable application engine 402 is reconfigured in accordance with the reconfiguration data and instructions. Block 612 may be referred to as partial reconfiguration, in which a portion of the reconfigurable circuitry/hardware is changed while the other part remains running/operating. In one embodiment, a given server board 375 reconfigures both of the FPGAs 350. In another embodiment, a given server board 375 reconfigures a given FPGA 350. Each of the reconfigurable application engine 402 may be reconfigured to same or different from each other. For instance, the reconfigurable application engine 402 of the (first) FPGA 350 is configured to perform a particular data encryption algorithm (pertaining to data storage or access) and the reconfigurable application engine 402 of the (second) FPGA 350 is configured to run a financial simulation application (requested by a network in communication with the system 300).

If the reconfigurable application engine 402 does not require reconfiguration to perform the acceleration task (yes branch of block 606), then the send/receive module 504 sends input/initial data and request to perform the acceleration task to the FPGA 350 via the I/O circuit switch 340 (block 614). In response, at a block 616, the FPGA 350 receives the input/initial data and request. At the FPGA 350, the requisite information is received by the network PCI interface 416, then ring(s) or crossbar(s) 420, and then to the reconfigurable application engine 402. The reconfigurable application engine 402 performs the acceleration task using the requisite information at a block 618. The result of or output data at completion of the acceleration task is sent from the reconfigurable application engine 402 (via ring(s) or crossbar(s) 420, network PCI interface 416, and I/O circuit switch 340) to the server board 375 (block 620).

In response, at a block 622, the output data from the FPGA 350 is received by the send/receive module 504 in the server board 375. Lastly, the server board 375 uses the received output data at a block 624. Usage may include using the output data within a larger application.

Cache Management

Embodiments of the storage system 300 are configured to handle data requests from the I/O circuits 320 at a faster rate than can be performed using HDDs, flash-based memory, or software. The FPGAs 350a,b, cache modules 355a,b, and tags and matching logic modules 422a,b facilitate faster handling of data communications using hardware circuitry. In some embodiments, the cache control 406 included in the FPGA 350a controls data to and from the cache modules 355a via the cache interface 404 and ring(s) or crossbar(s) 420 also included in the FPGA 350a. The cache control 406 included in the FPGA 350a also communicates with the tags and matching logic module 422a to control the cache modules 355a. Similarly, the cache control 406 included in the FPGA 350b controls data to and from the cache modules 355b via the cache interface 404 and ring(s) or crossbar(s) 420 also included in the FPGA 350b. The cache control 406 included in the FPGA 350b also communicates with the tags and matching logic module 422b to control the cache modules 355b. The FPGAs 350a,b (in particular, cache interface 404 and cache control 406), cache modules 355a,b, and tags and matching logic modules 422a,b are collectively referred to as the cache management subsystem. Rather than having the server boards 375 control the data requests from the I/O circuits 320 or rely on the flash modules 330 to store and provide the requested data, the cache management subsystem acts as the efficient middleman.

From the perspective of the I/O circuits 320, it appears that all the data it needs to access and/or all the data it needs to store in the system 300 are provided from the cache modules 355a and/or 355b. Thus, the cache modules 355a,b appear to be an infinite cache. This is the case even though the flash modules 330 are the primary storage elements for the system 300 and the capacity of the cache modules 355a,b is insufficient to hold all the data stored in the system 300.

In some embodiments, the total storage capacity of the flash boards 335a,b is significantly larger than the total storage capacity of the cache modules 355a,b. The total storage capacity of the flash boards 335a,b may be a multiple of the total storage capacity of the cache modules 355a,b. For instance, the ratio of the total storage capacity of the flash boards 335a,b to the total storage capacity of the cache modules 355a,b may be 1000:1. As another example, the total storage capacity of the flash boards 335a,b may be on the order of terabytes while the total storage capacity of the cache modules 355a,b may be on the order of gigabytes. In some embodiments, the total storage capacity of the cache modules 355a,b may be limited by the physical dimensions of the chassis in which the cache modules 355a,b are housed.

The cache management subsystem is implemented within the system 300 to take advantage of features such as the access times for the cache modules 355a,b (which are DRAMs) being approximately a thousand times or so faster than for the flash boards 335a,b. And unlike flash, which is limited to a certain number of writes before it degrades, DRAMs do not degrade. In some embodiments, the cache control 406 may comprise reconfigurable circuitry/hardware. In other embodiments, the cache control 406 may comprise non-reconfigurable circuitry/hardware.

The tags and matching logic modules 422a,b comprise hardware circuitry configured to hold at least a cache table (or similar data structure information) that correlates memory locations of the flash boards 335a,b to memory locations of the cache modules 355a,b, respectively. The tags and matching logic modules 422a,b comprise a type of hardware circuitry (e.g., TCAM) capable of very rapid searching or lookup of data stored within it.

Figure 7A:
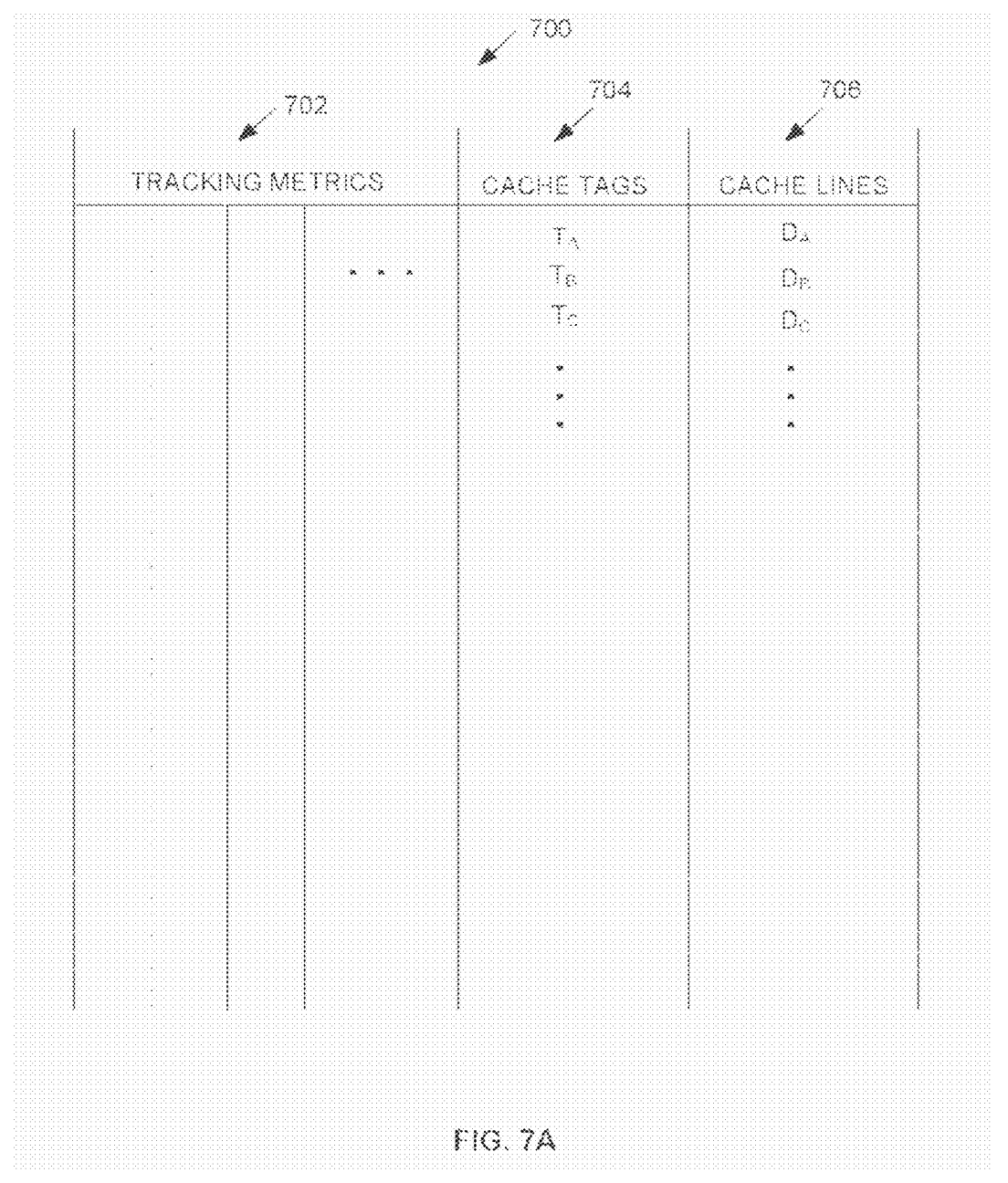

FIG. 7A illustrates an example cache table 700 (or data structure) maintained in each of the tags and matching logic modules 422a,b for its respective corresponding cache modules 355a,b according to some embodiments. The cache table 700 includes a plurality of fields such as, but not limited to, one or more tracking metrics 702, cache tags 704, and cache lines 706. The data storage memory space of the cache modules 355 is apportioned as a plurality of cache lines, each cache line comprising a certain memory size according to a system setting or design choice. As an example, a cache line may be a certain number of bytes such as 32 bytes, 64 bytes, 128 bytes, 4,000 bytes, or other memory size that is a multiple of a block memory size of the flash modules 330. (Data is read from and written to the flash modules 330 a certain number of cells at a time, the set of number of cells referred to as a block.) Hence, a given cache module 355 contains a certain number of cache lines based on its total data storage capacity and specified cache line size. Each cache line of a given cache module 355 is represented as a row in the cache table 700. The cache table 700 may comprise a million or more rows of cache line entries.

Each row of the cache lines 706 indicates whether data is stored in that cache line data area, what portion of that cache line data area is empty or occupied, information about the stored data, and other information relating to the stored data and/or use of the cache line data area. Data stored in a given cache line is associated with a unique cache tag (also referred to as a tag) that serves as an identifier or name for the data and/or the particular cache line. The cache tags are provided in the cache tags 704. Each cache tag comprises one or more pieces of information including, but not limited to, the flash memory address corresponding to the data associated with the given cache tag. For example, the flash memory address may be included in an I/O request originating from the I/O circuit 320. As another example, if the particular data was obtained from the flash modules 330 and then stored on the cache modules 355, the particular flash memory location(s) from which the data was taken is reflected in the corresponding cache tag. Additional details pertaining to cache tags are described below in the discussion of the protocol offload engine 418. The cache tags are searched or looked-up to determine whether data associated with a given tag resides in the cache modules 355.

Lastly, the data stored in each of a given cache line also has associated with it one or more tracking metrics 702 such as, but not limited to, age (e.g., when the data was written to the cache modules 355 measured in number of CPU cycles), number of read requests for that data, number of write requests for that data, user specified information (e.g., data will be rarely accessed, data is to be stored in archival area of flash boards 335, often used data, etc.), system known information (e.g., reconfigurable application engine 402 knows that the output data is generates will be rarely accessed data), and other data use information that can be tracked for statistical and/or cache management purposes. Tracking metrics 702 may also be referred to as data counters.

A backup copy of the cache table 700 is maintained at all times within the system 300. For instance, if the tags and matching logic modules 422a,b comprise TCAMs, then in the case of power failure, the cache table 700 will be lost. To ensure against such a scenario, a duplicate copy of the cache table 700 can be maintained within the FGPA 350a,b.

Figure 7B:
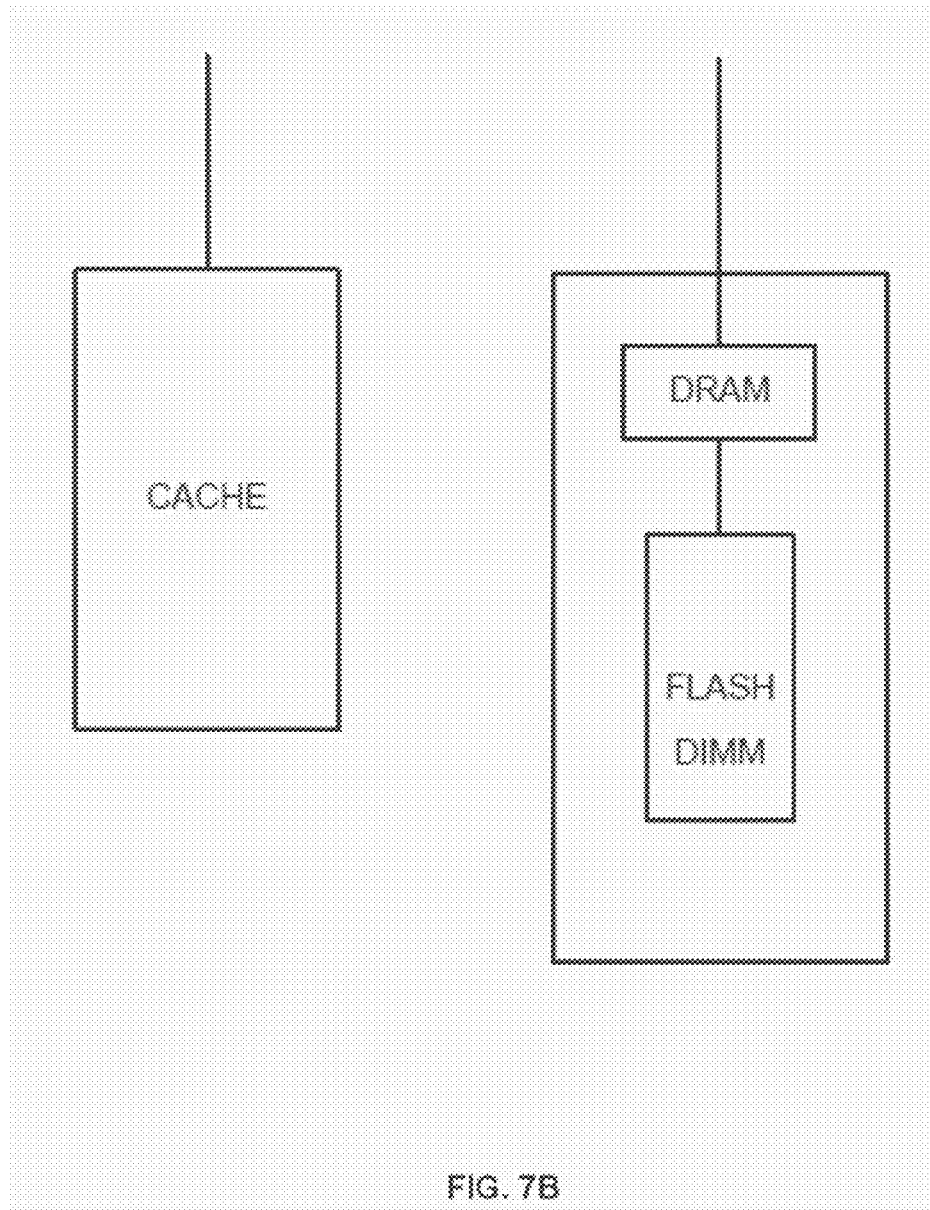
FIG. 7B is a block diagram depicting a dual inline memory module containing DRAM and flash memory, as may be used in example embodiments.

FIG. 7B depicts a dual inline memory module containing DRAM and flash memory that can be plugged into a standard DDR3 DIMM socket. In some embodiments, during operation the module behaves similar to a standard DDR3 DRAM DIMM, however, upon the occurrence of the events specified below, data is copied between the DRAM and flash. The entire contents of on-board DRAM are written to flash upon the occurrence of any of the following:

If configured to do so: A drop in supply voltage is detected by an on-board circuit. Super-capacitors supply power to the Cache module to complete this operation.

A SAVE command is received via the I2C interface on the DIMM socket.

An interrupt is received via a pin on the DIMM socket.

The contents of flash are written to DRAM upon occurrence of any of the following events:

If configured to do so: After power up if a valid saved image is detected in flash.

A RESTORE command is received via the I2C interface on the DIMM socket.

Figure 8A:
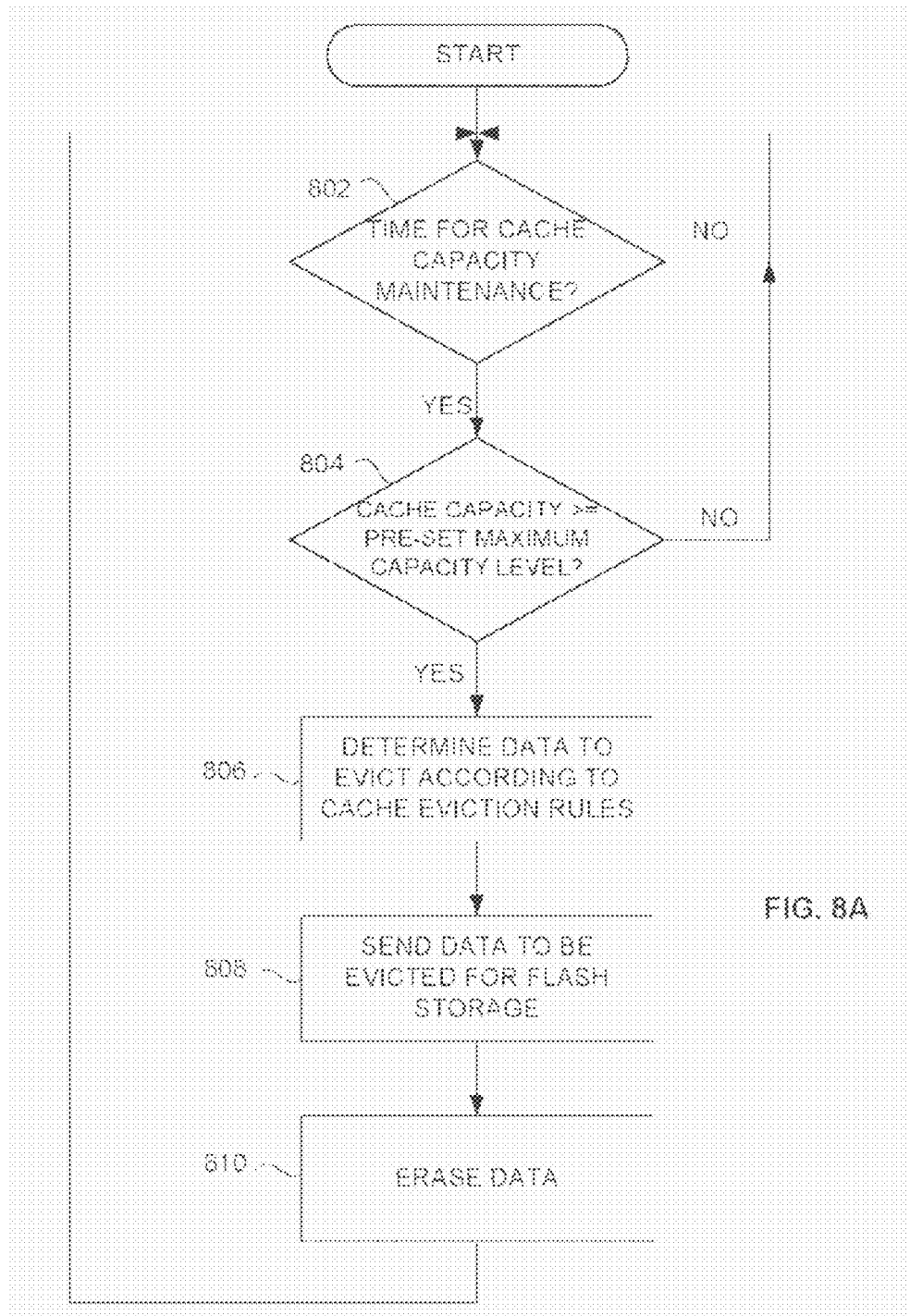
FIGS. 8A-8C illustrate example flow diagrams showing caching principles, policies, or rules implemented by the cache management subsystem included in the FPGAs according to some embodiments.
Figure 8B:
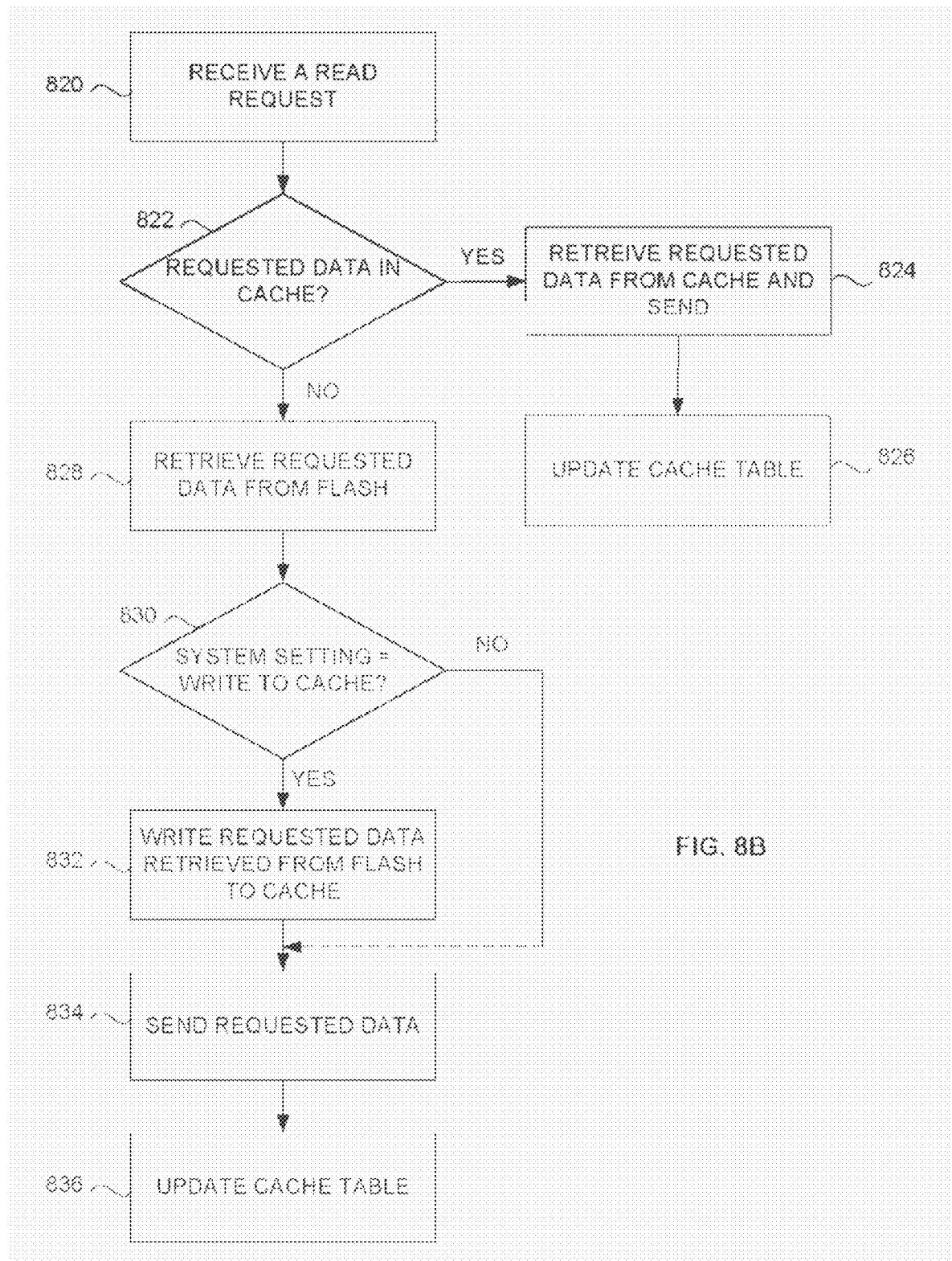
Figure 8C:
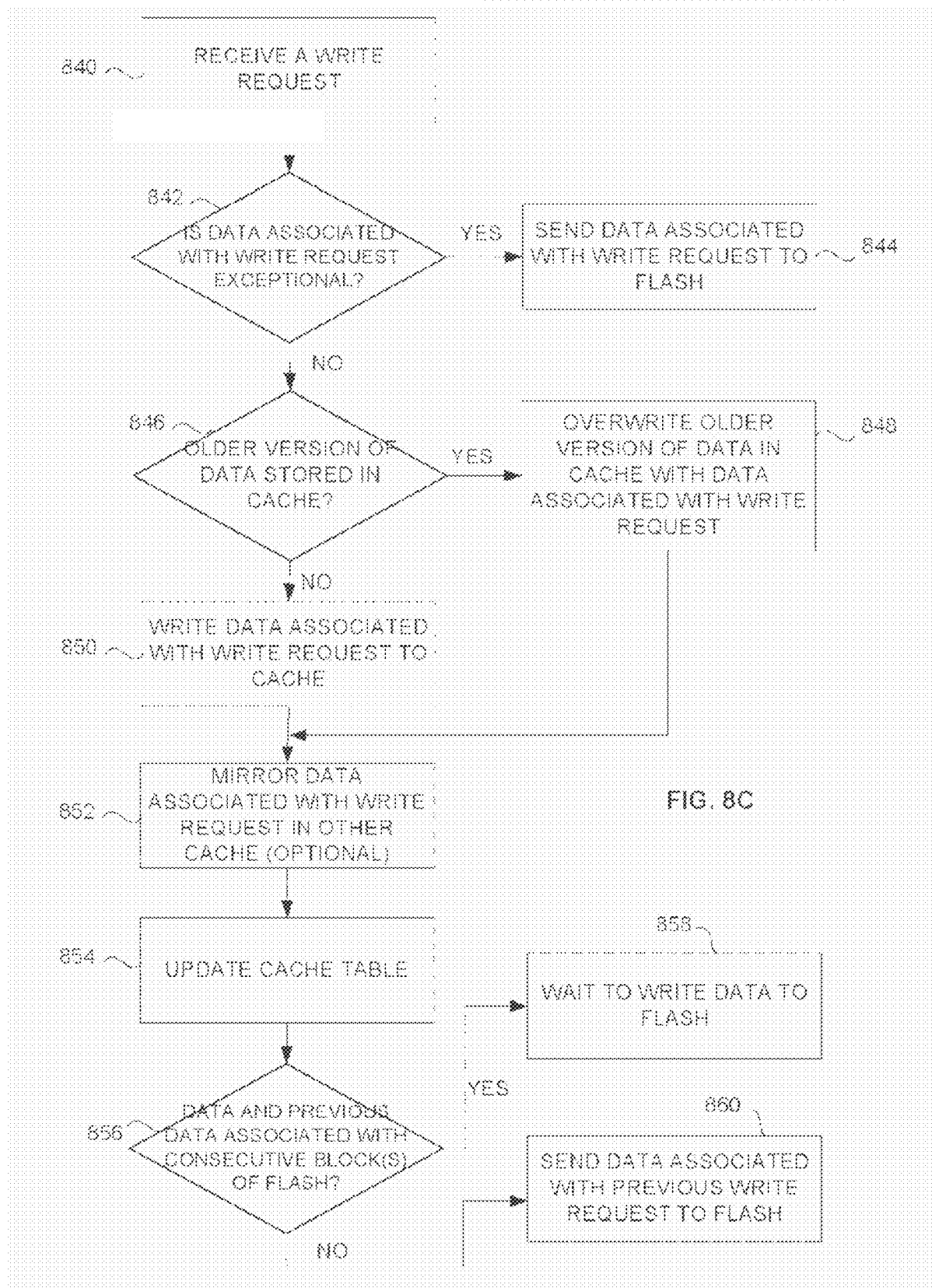

FIGS. 8A-8C illustrate example flow diagrams showing caching principles, policies, or rules implemented by the cache management subsystem according to some embodiments. Although FIGS. 8A-8C are shown as distinct flow diagrams from each other, it is understood that one, two, or all of these flow diagrams may be implemented at any given time during operation of the system 300. Especially because the system 300 handles many I/O requests from the I/O circuits 320 at any given time and the cache management subsystem itself also performs background operations that may or may not be directly triggered by a given I/O request.

In FIG. 8A, the cache control 406 in each of the FPGAs 350a,b performs cache capacity management operations for its cache modules 355a,b, respectively, to ensure that the cache modules 355 always have sufficient capacity to handle I/O requests. If cache capacity is not adequately monitored and optimized, for example, there may not be enough space to fully handle a new write request. Cache management for cache modules 355a and 355b are performed independently of each other.

At a block 802, the cache control 406 determines whether it is time to perform cache capacity maintenance. Maintenance may be a continuous background operation, a periodic background operation, or on a need basis type of operation. Maintenance frequency can be a system setting, user setting, or dynamic setting based on current operating conditions of the system 300. If maintenance is initiated (yes branch of block 802), then the cache control 406 determines whether the current data storage capacity of the cache modules 355a or 355b (depending on which set of cache modules is associated with the given cache control 406) is at or above a pre-set maximum capacity level (block 804). The pre-set maximum capacity level is a certain value that is pre-set by the system 300 or user, and represents the portion of the total data storage capacity of the cache modules that can be occupied while having a "safe" amount of available space in case, for example, an unexpectedly large write request is received. Examples of pre-set maximum capacity level include, but are not limited to, 70%, 80%, or some other value. In some embodiments, the pre-set maximum capacity level may be adjusted over time as more system usage information becomes available. Instead of expressing the pre-set maximum capacity level as a percentage of the total data storage capacity, for example, it is understood that it can be expressed as a minimum available or reserved free space.

If the current cache capacity is below the pre-set maximum capacity level (no branch of block 804), then the flow diagram returns to block 802. Otherwise the current cache capacity is too close to the pre-set maximum capacity level, and some of the stored data needs to be moved to the flash modules 330 and evicted or erased from the cache modules 355a or 355b (depending on which set of cache modules is associated with the given cache control 406) (yes branch of block 804).

Next at a block 806, the cache control 406 determines what data to displace from the cache modules 355a or 355b (depending on which set of cache modules is associated with the given cache control 406) according to a set of cache eviction rules. In some embodiments, the cache eviction rules may comprise an algorithm implemented in software. The cache eviction rules may be set by the system 300 or a user. The cache eviction rules may comprise one or more rules, and if it comprises more than one rule, rules may have a priority order relative to each other, a certain rule may override another rule, two rules in combination may override a third rule, or the like. Example cache eviction rules comprise, without limitation:

Evict data in cache line having the least amount of write activity
 Evict data in cache line based on age (e.g., oldest)
 Evict data in cache line having the least amount of reads
 Evict or keep data in cache line based on user specified directive (e.g., user specified that certain data will be often used, rarely used, or be archival data)
 Evict or keep data in cache line based on other sources (e.g., reconfigurable application engine 402 specified that certain data will be often used, rarely used, or be archival data)

The cache control 406 checks the cache table 700 included in its corresponding tags and matching logic module 422, and in particular, compares the information provided in the tracking metrics 702 field of the cache table 700 for all cache lines containing data against each other according to the cache eviction rules. In one embodiment, the cache eviction rule may comprise evicting data stored in the cache line(s) that is the least written. In another embodiment, the cache eviction rule may comprise evicting data stored in the cache line(s) that is the least written except for data that is "pinned" to stay within the cache based on a user specified directive.

Once the cache line(s) to empty are identified, the cache control 406 sends data stored in those cache line(s) to the flash modules 330 for storage (block 808). Such data is erased, emptied, or evicted from those particular cache line(s) at a block 810. The flow diagram then returns to block 802. Thus, the cache capacity of cache modules 355a or 355b (depending on which set of cache modules is associated with the given cache control 406) is maintained at or below the pre-set maximum capacity level. It is understood that blocks 808 and 810 may occur simultaneously of each other.

FIG. 8B illustrates operations performed by the cache management subsystem in connection with a data read request from any of the I/O circuits 320. At a block 820, the cache control 406 receives a read request originating from one of the I/O circuits 320. In some embodiments, read requests originating from I/O circuit 320a or 320b are handled by the cache control 406 included in the FPGA 350a (for normal operational state of the system 300), and read requests originating from I/O circuit 320c or 320d are handled by the cache control 406 included in the FPGA 350b (again, assuming normal operational state of the system 300). The data request includes a particular memory address location of the flash modules 330 at which the requested data is stored.

Next at a block 822, the tags and matching logic module 422a or 422b (corresponding to the particular cache control 406 handling the read request) performs a look-up of its cache table 700 to determine whether the requested data exists in the cache modules 355a or 355b. The cache tags 704 are searched to see which one, if any, contains the same flash memory address location as the particular memory address location provided in the data request. In one embodiment, all of the cache tags 704 in the cache table 700 may be searched (fully associative). In another embodiment, a subset of the cache tags 704 may be searched (set associative). In an alternative embodiment, a particular one of the cache tags 704 may be searched (direct mapped). The tags and matching logic module 422 is configured to perform the look-up function several orders of magnitude faster than may be possible if the cache table 700 resides in the FPGA 350, for example. This may be the case even if there are a large number of rows (e.g., cache lines) in the cache table 700, such as thousands of rows.

If a matching cache tag is found (yes branch of block 822), the cache control 406 accesses the data corresponding to the matching cache tag from the cache module 355 and sends the retrieved data to the originating I/O circuit 320 (block 824). The retrieved data is the requested data in the read request. The tracking metrics 702 for at least that data is updated in the block 826. For example, the counter for the number of reads of that data may be incremented by one. If the retrieved data was previously written to the cache module 355 (in a previous write request) and such data was not evicted from the cache module 355 due to cache management operations (see FIG. 8A), then such data is present in the cache module 355 for later access such as the present read request. Then there is no need to retrieve the data from the flash modules 330. Data retrieval from a DRAM cache is significantly faster than from flash-based memory, upwards of a thousand times faster using cache than flash.

If no matching cache tag is found (no branch of block 822), the requested data is not present in the cache modules 355 and is retrieved from the flash modules 330. At a block 828, the cache control 406 initiates retrieval of the requested data from the appropriate flash modules 330. Next at a block 830, a system setting (or user specified setting) is checked to see whether the requested data retrieved from the flash modules 330 should be copied to the cache modules 355. If the system is set not to copy to cache modules 355 (no branch of block 830), then the flow diagram proceeds to block 834. Otherwise the retrieved data is copied to the cache modules 355 (yes branch of block 830 and block 832).

The retrieved data is also sent by the cache control 406 to the I/O circuit 320 that made the read request (block 834). The cache table 700 is correspondingly updated at a block 836. Because data is written to particular cache line(s) of the cache modules 355 that did not exist before, the cache tags 704 and cache lines 706 fields for those cache line(s) are populated accordingly. The associated tracking metrics 702 are also populated, at least, for example, the age field.

Although blocks 830 and 832 are shown prior to block 834 in FIG. 8B, it is contemplated that block 834 and blocks 830/832 may be performed simultaneously to each other or in reverse order from that shown in FIG. 8B.

FIG. 8C illustrates operations performed by the cache management subsystem in connection with a data write request from any of the I/O circuits 320. At a block 840, the cache control 406 receives a write request originating from one of the I/O circuits 320. In some embodiments, write requests originating from I/O circuit 320*a* or 320*b* are handled by the cache control 406 included in the FPGA 350*a* (for normal operational state of the system 300), and write requests originating from I/O circuit 320*c* or 320*d* are handled by the cache control 406 included in the FPGA 350*b* (again, assuming normal operational state of the system 300). The data request includes the data to be written as well as a particular memory address location of the flash modules 330 at which the data is to be written.

At a block 842, the cache control 406 determines whether the data associated with the write request is exceptional. While the default rule is to store all data associated with write requests to the cache modules 355 and then from the cache modules 355, copy to the flash modules 330 (at some later point in time), one or more exceptions to the default rule may be implemented. One or more exception criteria may be a system setting or user specified setting. For example, the exception may comprise there being no exception to the default rule. As another example, data exceeding a certain size (e.g., data that if written to the cache modules 355 may exceed the cache capacity or likely to exceed the pre-set maximum capacity level) may warrant storing directly in the flash modules 330 without first storing in the cache modules 355. As still another example, the write request or the data associated with the write request itself may specify that the data will be rarely accessed (e.g., is archival data) or has a certain characteristic that warrants being stored directly in the flash modules 330 without first being stored in the cache modules 355.

If the data associated with the write request is determined to be exceptional (yes branch of block 842), then the cache control 406 sends such data to be written to the flash modules 330 (block 844). Otherwise the data associated with the write request is not exceptional (no branch of block 842) and operations are performed to write to the cache modules 355. At a block 846, the tags and matching logic module 422 checks the cache table 700 for a cache tag containing the same flash memory address location as provided in the write request. If a matching cache tag is found (yes branch of block 846), this means that an older version of the data associated with the write request (or some data in general) is currently stored in the cache line(s) now intended for the data associated with the write request. The cache control 406 facilitates overwriting the existing data at these cache line(s) with the data associated with the write request (block 848). Then the flow diagram proceeds to block 852.

If no matching cache tag is found (no branch of block 846), then the cache control 406 facilitates writing the data associated with the write request to empty/available cache line(s) in the cache modules 355 (block 850).

Next at a block 852, the data associated with the write request is additionally copied to empty/available cache line(s) in the cache modules 355 associated with the other FPGA 350. This mirroring of data between the cache modules 355*a* and 355*b* occurs via the inter-FPGA interface 412 and the crossover path 383 connecting the FPGA 350*a* to FPGA 350*b*. In some embodiments, block 852 is optional when the crossover path 383 is omitted from the storage system 300. In other embodiments, the mirroring of data associated with the write request in both cache modules 355*a* and 355*b* is initiated before the write request is received at a given FPGA 350. The write request from the I/O circuit 320*a* is received by the I/O circuit switch 340*a* and is split into two identical requests, one going to the FPGA 350*a* and the other to the FPGA 350*b*. Then the cache control 406 in each of the FPGAs 350*a* and 350*b* can store the data associated with the write request (also referred to as write data) in its respective cache modules 355*a* and 355*b*. At a block 854, the cache table 700 included in the tags and matching logic module 422 is updated to reflect the addition of the data associated with the write request into certain cache line(s) of the cache modules 355.

Because flash modules 330 comprise the primary or permanent data storage medium for the storage system 300, the data associated with the write request, although already written to the cache modules 355 (see blocks 848 and 850), is eventually written to the flash modules 330. Nevertheless, the cache management subsystem is configured to intelligently perform data writes to the flash modules 330 taking into account the characteristics of the flash modules 330. In order to prolong the usability of flash modules 330, which are limited to a certain number of writes before degrading, the cache management subsystem accumulates certain type of data corresponding to a plurality of write requests and then performs a single write of the accumulated data to flash modules 330 rather than performing a write to flash modules 330 for each write request. This means that if, for example, there are 25 write requests, instead of writing to flash modules 330 25 times, once for each of the 25 write requests, the data corresponding to these 25 write requests may be written at the same time and once (e.g., a single write operation) to the flash modules 330.

After the data associated with the write request is written to cache module 355 and cache table 700 updated accordingly, the cache control 406 determines whether the data associated with the write request and data associated with a previous write request are associated with consecutive block(s) of the flash modules 330 (block 856). Both the data associated with the write request and data associated with a previous write request are handled by the same cache control 406. If both data are associated with consecutive block(s) of the flash modules 330 (yes branch of block 856), then the cache control 406 waits to write data associated with the write request and the data associated with previous write request to flash modules 330 (block 858). The cache control 406 accumulates data to be written to the flash modules 330. If the two data are associated with non-consecutive block(s) of flash modules 330 (no branch of block 856), then the cache control 406 sends data associated with the previous write request to be written in flash modules 330 (block 860).

Accordingly, the cache management subsystem is configured to act as a middleman between the I/O circuits 320 and flash modules 330 for every read and write requests from the I/O circuit 320. For all read and write requests, the presence of data associated with the read or write request in the cache modules 355 is checked before the flash modules 330 are involved. Based on the presence or absence of such data in the cache modules 355, the cache management subsystem performs optimization operations to complete the data requests significantly faster than is possible with flash modules 330 alone. The cache management subsystem also prolongs the useful lifespan of flash modules 330 by minimizing the number of writes to flash modules 330 without sacrificing completeness of data being stored in the flash modules 330. All data associated with write requests are written to cache modules 355 (prior to be written to flash modules 330) unless the data fits an exception. All data associated with read requests that are retrieved from the flash modules 330 may or may not be written to cache modules 355 (depends upon system or user setting). All data associated with write requests similarly may or may not be written to cache modules 355 corresponding to both FPGAs 350 (depends upon system or user setting). The cache management subsystem actively maintains the used storage capacity level of the cache modules 355 at or below a pre-set capacity level (e.g., 70%, 80%, etc.) by evicting data stored in the cache modules 355 that fit one or more eviction rules, as needed. An example of an eviction rule comprises evicting data that has the least amount of write activity (and moving it to the flash modules 330).

Behavior Monitoring

The storage system 300 may experience performance variations over time, such as bottlenecks at certain times. The performance of the storage system 300 may be improved or tweaked over time based on measurements of actual system performance. In some embodiments, the storage system 300 offers a plurality of potential measurement or monitoring events (e.g., via a set of menu options) for selection by a system analyst or diagnostician. Each of the plurality of potential measurement or monitoring events comprises a particular behavior, characteristic, attribute, or event that occurs at a particular location within the system 300. The behavior control 410 included in each of the FPGAs 350 is configured to facilitate handling of event monitoring as directed by the system analyst or diagnostician. For example, the particular event of interest may be to find out how many data packets are received by the system 300 within the next 10 hours that are 213 bytes in size. As another example, the system 300 may be experiencing an unexpected decrease in performance and in order to diagnosis where the bottleneck is occurring, one or more points within the system 300 may be targeted for event monitoring.

The system 300 may monitor hundreds, thousands, or tens of thousands of particular behaviors, characteristics, attributes, or events that provide detail logs of various system operations—referred to as low level behavior monitoring or measurements. In addition, the behavior control 410 comprising reconfigurable hardware circuitry can be configured to provide higher level behavior monitoring or measurements. The hardware circuitry permits measurements to keep up with real-time activities within the system 300 (in which software-based measurements can't keep up). And the reconfigurability of the hardware circuitry permits different behaviors, characteristics, attributes, or events to be captured over time as needed. Although low level behavior monitoring provides a large amount of detailed data, the data tends to be discrete event-type data and may not correlate to each other in a manner useful to the system analyst or diagnostician. The higher level behavior monitoring aims to correlate behavior monitoring data in a meaningful way that is useful for troubleshooting, future system upgrades, system fine tuning, and the like.

Figure 9:
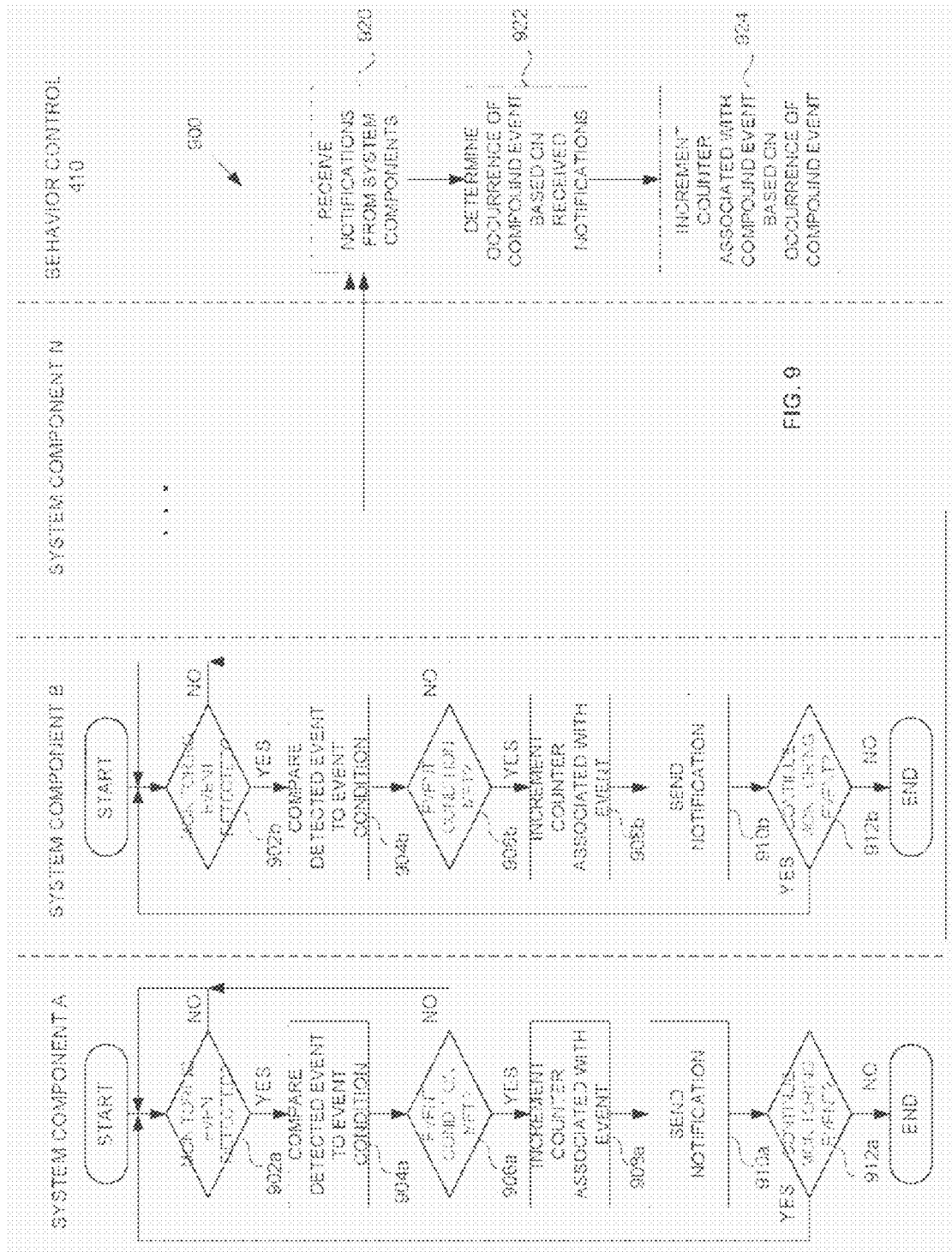
FIG. 9 illustrates an example flow diagram showing higher level behavior, characteristic, attribute, or event monitoring by the behavior control included in the FPGAs according to some embodiments.

FIG. 9 illustrates an example flow diagram 900 showing higher level behavior, characteristic, attribute, or event monitoring by the behavior control 410 according to some embodiments. The higher level behavior, characteristic, attribute, or event is also referred to a combinational event, compound event, or application level event. The compound event comprises at least two events (a first event and a second event) both occurring within the system 300 and which satisfy at least one pre-set condition relative to each other. An example compound event may be as follows: what is the percentage of data packets coming into the system 300 that are 213 bytes in size AND go to RAID group seven in the next 10 hours. Another example compound event may be: count the number of data packets that use iSCSI protocol AND are intended for a particular flash module 330. Another example compound event may be: when the reconfigurable application engine 402 runs a particular image compression algorithm, count the number of images compressed by the algorithm that are compressed greater than 90 percent. It is understood that more than two events, more than one pre-set condition, or other constraints together define a given compound event to be monitored by the behavior control 410. It is also understood that although the examples above illustrate use of the logic operator AND as a pre-set condition between the first and second events, the pre-set condition can alternatively be other logic operators such as OR, XOR, NOR, NAND, etc.

For each of the events involved in a given compound event, comparative type logic (also referred to as comparative logic, comparer logic, or comparator element) and a counter are configured in the system component to be monitored for the given event. For example, if an event involves monitoring the size of all incoming data packets to the system 300, comparative type logic and counter may be provided within each of the I/O circuits 320. As another example, if an event involves monitoring input or output characteristics of the reconfigurable application engine 402, then comparative type logic and counter may be located within the reconfigurable application engine 402. For each system component (e.g., system component a, system component b, ..., system component n) involved in a compound event, appropriate comparative type logic, counter, and other measurement/detection elements are configured therein. Each of the comparative type logics is provided with the appropriate pre-set event condition or comparer value (e.g., look for 213 byte size data packet, greater than 90% compression image output, iSCSI protocol, etc.).

At a system component a (e.g., I/O circuit 320a, I/O circuit switch 340a, FPGA 350a, reconfigurable application engine 402, etc.), the comparative type logic is set up to monitor a first event of a given compound event. If no event is detected (no branch of block 902a), then the monitoring continues. If an event is detected (yes branch of block 902a), then the comparative type logic compares the detected event to the pre-set event condition or comparer value at a block 904a. If the condition is not met (no branch of block 906a), then the flow diagram 900 returns to block 902a. Otherwise the condition is met (yes branch of block 906a) and the flow diagram 900 proceeds to block 908a. The counter associated with the first event/comparative type logic is incremented at the block 908a.

Continuing the example above, system component a may be the I/O circuit 320a, the comparative type logic may be configured to detect incoming data packets, and the pre-set condition may be 213 byte size. Thus, a successful first event comprises a data packet received by the I/O circuit 320a that is 213 bytes in size.

Once the counter is incremented, the system component a sends notification to the behavior control 410 (block 910a). The notification informs the behavior control 410 that an instance of the first event of the compound event has occurred. The notification also provides additional information about the first event. For example, the data packet may be associated with a unique identifier and the unique identifier is provided to the behavior control 410. The unique identifier will be used by the behavior control 410 to correlate other event notifications to each other. For example, the unique identifier permits tracing of a particular data packet's pathway through the system 300 (or at least to certain system components within the system 300).

Next at a block 912a, a check is performed as to whether to continue monitoring for the event. The comparative type logic may be configured to monitor only for a specific time period (e.g., 12 hours) or until some other condition is met. If monitoring period should continue (yes branch of block 912a), then the flow diagram 900 returns to block 902a. Otherwise (no branch of block 912a), the monitoring stops.

Each of the system components a, b, . . . , n involved in monitoring the compound event performs operations similar to those discussed for blocks 902a-912a. As shown in FIG. 9, system component b performs blocks 902b-912b, system component n performs blocks 902n-912n, and the like. It is understood that each of the system components a, b, . . . , n involved in the compound event monitors for respective first event, second, event, and so forth of the compound event.

At a block 920, the notification sent in each of blocks 910a, 910b, . . . , 910n are received by the behavior control 410. In response, the behavior control 410 determines whether the compound event has occurred by correlating the received notification information at a block 922. Continuing the example of the 213 byte size data packet, let's assume the second event of the compound event is that such data packet is destined for RAID group seven. If the behavior control 410 receives a notification from the system component a of a 213 byte size data packet having a certain unique identifier and also a notification from the system component b of a data packet received at RAID group seven having the same certain unique identifier, then the behavior control 410 is able to correlate the two notifications together based on the common unique identifier. The pathway of the particular data packet within the system 300 is traced by the behavior control 410. Upon detection of the compound event, the behavior control 410 increments a counter associated with the compound event at a block 924.

The operations of FIG. 9 may be performed for each of a plurality of compound events being monitored by the behavior control 410. In this manner, the behavior control 410 monitors one or more behavior attributes of at least a portion of the system 300.

Raid

The RAID compute engine 414 included in each of the FPGAs 350a,b comprises reconfigurable or non-reconfigurable hardware circuitry to facilitate redundant grouping of flash modules 330 to improve chances of data recovery in failure scenarios. In some embodiments, all of the RAID functionalities may be controlled by the RAID compute engine 414. In other embodiments, the storage tier 315 may include some RAID functionalities and other (or master) functionalities may be handled by the RAID compute engine 414.

Offloading Data Transfers

Hardware circuitry included in FPGAs 350 are used to offload the software-based processing performed by the servers in the root complexes 310a,b during data transfers in read and write operations. The FPGAs 350a,b use reconfigurable hardware circuits for read and write data transfers that are faster than the equivalent data transfer software executing on a processor. The CPU associated with the FPGA 350 in the interconnection fabric or a master CPU may be involved in providing instructions to configure the FPGA 350 to handle the offloading of data transfers. The FPGA 350 is configured by code executing on the CPU at boot up and may be reconfigured anytime the component configuration in the system is altered (e.g., anytime there is a change in the configuration of memory devices).

The offloading of data transfer software executing on any CPU to the FPGA 350 involves the FPGA being configured to perform translations of logic unit number (LUN) and logic block address (LBA) in the Internet small computer system interface (iSCSI) domain into PCIe configuration addresses to transfer data to flash memory. Data addresses, such as those involved in the iSCSI protocol and maintained in the Internet environment, are managed in terms of LUNs and LBAs. However, in the domain of storage devices maintained in the PCIe P2P connectivity environment, addresses corresponding to the storage devices are managed according to the PCIe address configuration space (see FIG. 10). A (master) server or CPU (server boards 375a,b) in the system 300 executes boot up software that determines the size and location of all data structures utilized in an address translation and configures the FPGA 350 with this information. The configuration process of FPGAs includes populating tables with address conversion information for establishing LUN maps and LBA maps to convert data addresses from the iSCSI standard to flash memory addresses, for example. Address configuration space is determined according to the enumeration process (above). Once the enumeration process has discovered endpoints in the switch fabric the FPGA 350 can be configured with the tables and mappings that provide LUN and LBA translation to PCIe addresses at will.

More particularly, the system 300 in accordance with some embodiments reduces processor, e.g., CPU and software, involvement and intervention in the control and throughput of dataflow between an external network environment and the storage system. The system 300 receives I/O requests from the external network. Typically, a basic amount of software must execute in a CPU before a given I/O request may be directed to an appropriate read or write hardware procedure (e.g., PCI read or write cycles) to be carried out. According to some embodiments, most, if not all, of the typical software execution on the CPUs in the I/O request types may be bypassed through offloading the processing of these requests to the protocol offload engine 418 included in the FPGAs 350a,b. In common cases of reads or writes to blocks or data objects, in some embodiments, the CPU (e.g., server boards 375a,b) may be bypassed entirely.

For instance, the iSCSI approach to data transfer between remote devices requires that the fundamental SCSI commands for controlling the I/O requests each be encapsulated in various levels of IP or TCP layers. Each one of these layers of encapsulation must be "unwrapped" by the CPU and DRAM in the software-intensive approach to I/O protocol servicing. This iSCSI approach further exacerbates the problem under the software-intensive approach to I/O processing. Instead, iSCSI read and write commands are offloaded to the FPGA 350 for processing. All other command types may be processed in the server boards 360 according to the iSCSI target software.

The I/O circuits 320 sends all other command types to the iSCSI target software that has its own dedicated descriptor rings in server memory (e.g., in server boards 360). The iSCSI target software executes in the CPU. Descriptor rings, according to example embodiments, are a circular-natured portion of memory that may be shared between a processor and a PCIe device to buffer information handed off between the two components during data transfers. Particular descriptor rings may be receive rings and transmit rings, for example. ISCSI allows multiple protocol data units (PDUs) to be placed in a single transmission control protocol (TCP) payload. The network interface controller or card (NIC) (e.g., I/O circuit switch 340a or 340b) places the entire TCP payload on the FPGA's descriptor ring only if all PDUs contained in that payload encapsulate either a read or a write command—if any other command types are inter-mixed with read or write commands, then the NIC will place the entire payload on the iSCSI target descriptor ring.

The FPGA 350 manages the caching of data involved in read and write transactions. The instructions provided to the FPGA 350 from the execution of configuration programs operating in the CPU (above) can configures the FPGA 350 to implement cache policies. Following the indexing of the LUN map and the LBA map, the translated PCIe address is used to determine an address match in cache tags maintained within the tags and matching logic module 422a or b. If there is a cache tag match, the data sought in the data transfer request is resident in the cache modules 355 and may be provided from cache modules 355. The access performance for cache memory is significantly greater than the access times for flash memory. Each cache hit (cache tag match) in a data transaction significantly improves performance compared to accessing flash memory directly. In this way data transactions may be completed entirely from cache and accomplished significantly faster than would acquiring the data from flash memory. In this way, as much of the data involved in read and write transactions as possible is provided from cache and cached respectively. In certain example embodiments, it may be possible to accomplish nearly all data transactions from cache.

FIG. 10 depicts a peer-to-peer address configuration space 1000 produced according to the enumeration process conducted in certain example embodiments. Address ranges within the interconnect address space are assigned during the enumeration process. This example P2P Memory space is divided into 256 64PB segments. A range of the address space in a first segment, labeled segment 0, corresponds to flash memory 405. Segment 1 contains all memory on any CPU socket (e.g., socket 0 memory and socket 1 memory 410a,b) and all memory attached to left and right FPGA's (cache modules 355a,b). Segments 2 and above contain memory exported by other devices and may also contain any address-mapped interrupts. The I/O devices are considered endpoints and get included in the address configuration space in the socket 0 memory and socket 1 memory.

Thus, the cache modules 355 are accessible by any other peer component through memory-to-memory transfers utilizing the interconnect address space 1000. This is possible due to the enumeration process including the cache modules 355 associated with the FPGA 350 in the same manner that all other peer devices associated with the switch fabric are enumerated.

Figure 11A:
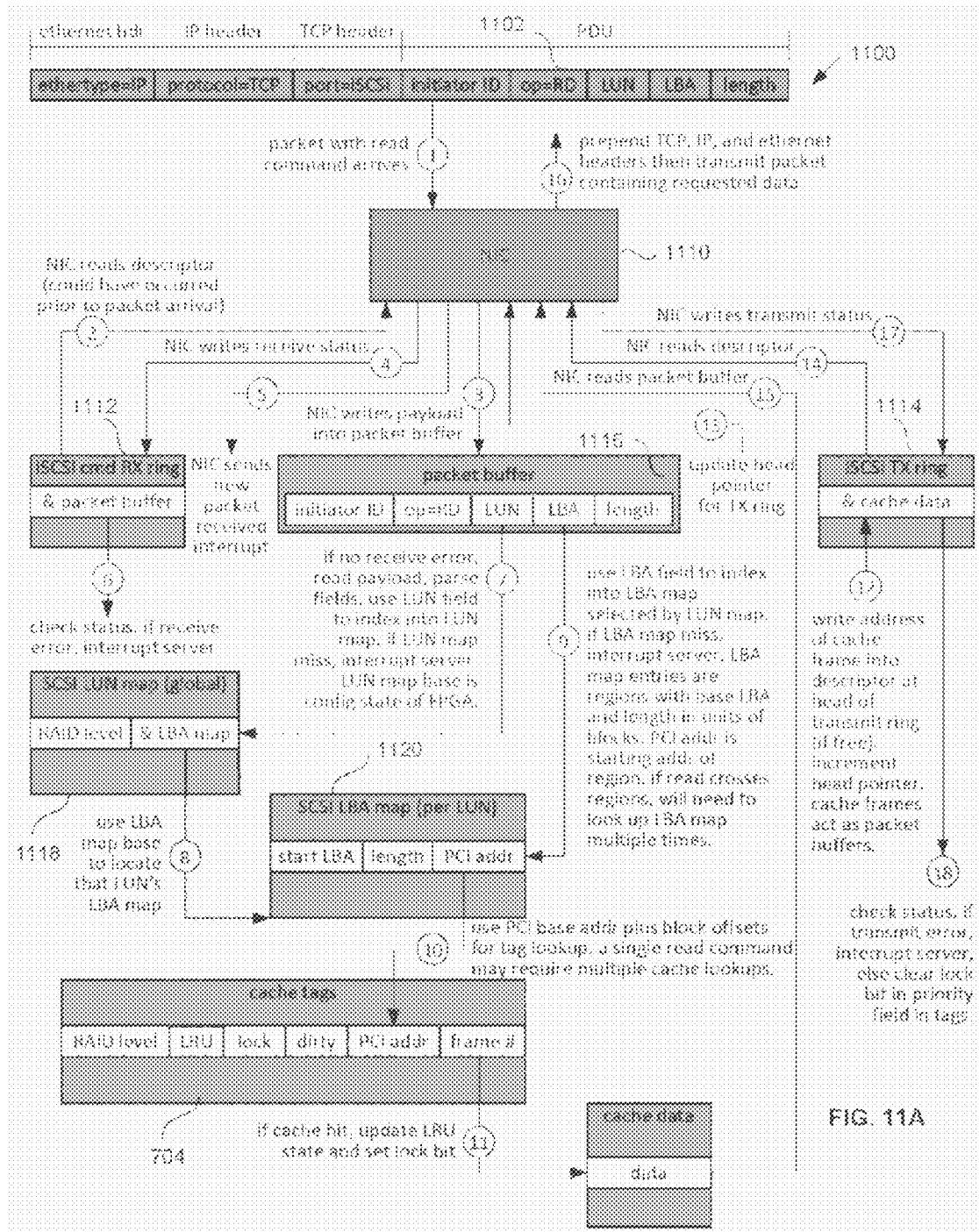
FIG. 11A is a block diagram illustrating data structures and order of operations related to processing a SCSI read command, according to an example embodiment.

The FPGAs 350 include the following offload operations data structures, which in conjunction with the cache tags in the tags and matching logic modules 422a,b, cached data in the cache modules 355, and the protocol offload engine 418 are capable of performing offloaded read and write operations:

NIC receive and transmit descriptor rings for offloaded protocols
NIC receive and transmit packet buffers
NIC receive hash
Protocol offload maps (one each for iSCSI, network file system (NFS), common Internet file system (CIFS), InfiniBand, etc.)
Code, stack, and global data used by programs executing on the compute engine
LUN map and LBA maps for iSCSI; other similar maps for other protocols FIG. 11A is a block diagram illustrating data structures and order of operations related to processing a SCSI read command, according to an example embodiment. An Ethernet packet 1100 including a read command 1102 arrives at a NIC 1110. The NIC 1110 comprises the hardware conversion element between the physical layer and data link layer. The NIC 1110 comprises, in some embodiments, the I/O circuit switch 340a or 340b. Alternatively, the NIC 1110 may be included in the FPGAs 350, and the I/O circuit switches 340a,b may be omitted from the system 300. The NIC 1110 provides the Ethernet packet 1100 to the protocol offload engine 418 included in the FPGA 350. The protocol offload engine 418, in turn, accesses various data structures and coordinates the order of operations to process the read command as shown in FIG. 11A. Data structures accessed include an iSCSI receiver ring (iSCSI RX ring) 1112, an iSCSI transmitter ring (iSCSI TX ring) 1114, a packet buffer 1116, SCSI LUN map 1118, SCSI LBA maps 1120, and cache tags 704 in the cache table 700. With the exception of the cache tags 704 (stored in the tags and matching logic modules 422a,b), the remaining data structures may reside in the FPGAs 350.

Figure 12:
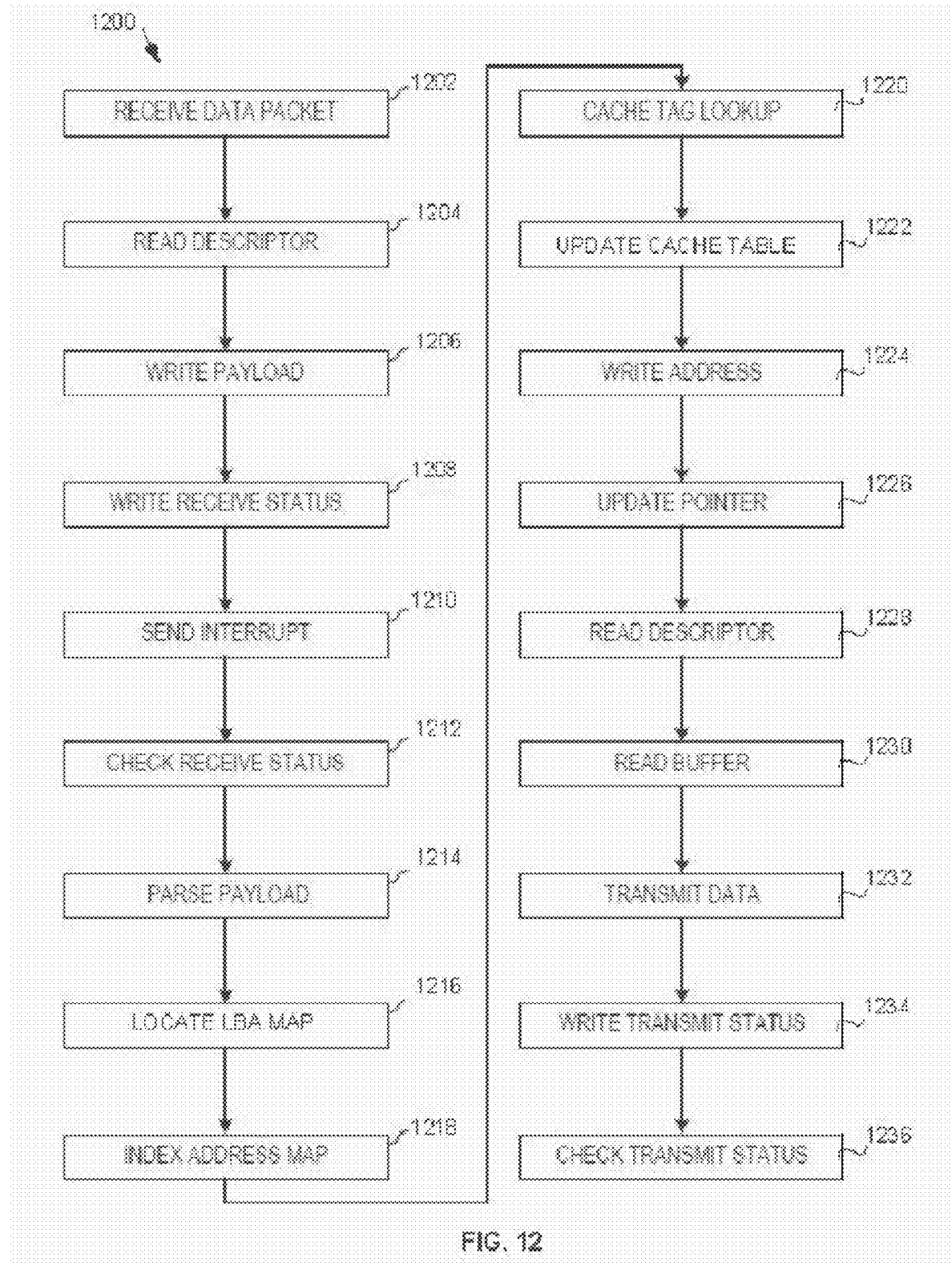
FIG. 12 is an example flow diagram illustrating a sequence of events in processing a SCSI red command according to some embodiments.

FIG. 12 is a flow diagram 1200 describing the sequence of operations performed in FIG. 11A in response to receipt of the Ethernet packet 1100, from the arrival of the read command to the transmission of the packet containing the requested read data. With the exception of the arrival of the packet containing the read command, all actions are performed by either the NIC 1110 (and are explicitly indicated as such) or by logic in the FPGA 350 (e.g., protocol offload engine 418). Performing operations relating to the read command in the FPGA 350 at hardware speeds is significantly faster than by execution of software performing the same read operation on the server boards 375a,b. Offloading processing of read operations from the server boards 375a,b to the FPGAs 350 frees up processing resources on the server boards 375a,b. Many of the data transfer steps involved in the read process may include interrupts and signal handshaking within the transfer protocol in order to accomplish the read transfer in software-based processing. This level of involvement by the software executing on the processor reduces the effective speed of the data transaction.

At a block 1202, the Ethernet packet 1100 (also referred to as a TCP-IP packet) including a read command arrives at the network interface tier, and more specifically, at the input of the NIC 1110 (1, corresponding to numerical operational steps denoted in FIG. 11A). In response, at a block 1204, the NIC 1110 reads the descriptor and forwards that to the iSCSI receiver ring 1112 (2). And at a block 1206, the NIC 1110 writes the payload (e.g., PDU of the packet 1100) into the packet buffer 1116 (3). Next at a block 1208, the NIC 1110 writes a receive status into the iSCSI receiver ring 1112 (4). The NIC 1116 also sends a new-packet-received interrupt signal (5) (block 1210). Next, at a block 1212, the receive status is checked (6), and if there is a receive error, the error indication is sent to the iSCSI target. If there is no receive error, at a block 1214, the payload in the packet buffer 1116 is read, the header fields parsed, and the LUN field extracted to index into the LUN map 11118 (7).

The LUN base is mapped to a fixed state of the FPGA 350. At a block 1216, the LBA map base in the LUN map 1118 is used to determine the LUN's (the LUN identified in the LUN field) LBA map (8). The LBA field is used to index into the LBA map 1120, which was determined according to the LUN map (9) (block 1218). If there is an LBA map miss, an error indicator is sent to the iSCSI target. LBA map entries are regions with a base (or start) LBA and region length indicated in units of blocks. The PCI addr is the starting address of the region.

Next at a block 1220, from the SCSI LBA map 1120, the PCI address plus block offsets are used for a cache tag 704 lookup in the cache table 700 (10). A single read command may require multiple cache tag lookups. If there is a cache hit, the LRU field of the cache tag 704 corresponding to the data requested is updated—e.g., incremented to indicate that a read of the data stored in that cache line is occurring (11) (block 1222). The lock bit field of the cache tag 704 corresponding to the data requested is also set to "lock"—to ensure that data to be read is not modified during the rest of the read process.

Next at a block 1224, the cache frame address is written into a descriptor at the head of the transmit ring 1114 (12). The head pointer is incremented and the cache frame may serve as packet buffers. The head pointer for the transmit ring 1114 is updated (13) (block 1226). The NIC 1110 reads the descriptor from the iSCSI transmit ring 1114 (and cache data) (14) (block 1228). Next, the NIC 1110 reads the packet buffer from the cached data corresponding to the requested data (15) (block 1230).

TCP, IP, and ethernet headers are prepended to the data read from storage in the headers and retrieved data are transmitted as a packet containing the requested data (16) (block 1232). The NIC 1110 writes a transmit status to the iSCSI transmit ring 1114 (17) (block 1234). The transmit status is checked in a block 1236, and if a transmit error is detected an error indication is sent to the iSCSI target (18). If no transmit error is detected, the lock bit field is cleared from the priority field in the cache tags 704 corresponding to the requested data.

In some embodiments, the iSCSI target software may need to be kept informed of the existence and progress of offloaded read and write commands so it can maintain its data structures including performance counters.

Figure 11B:
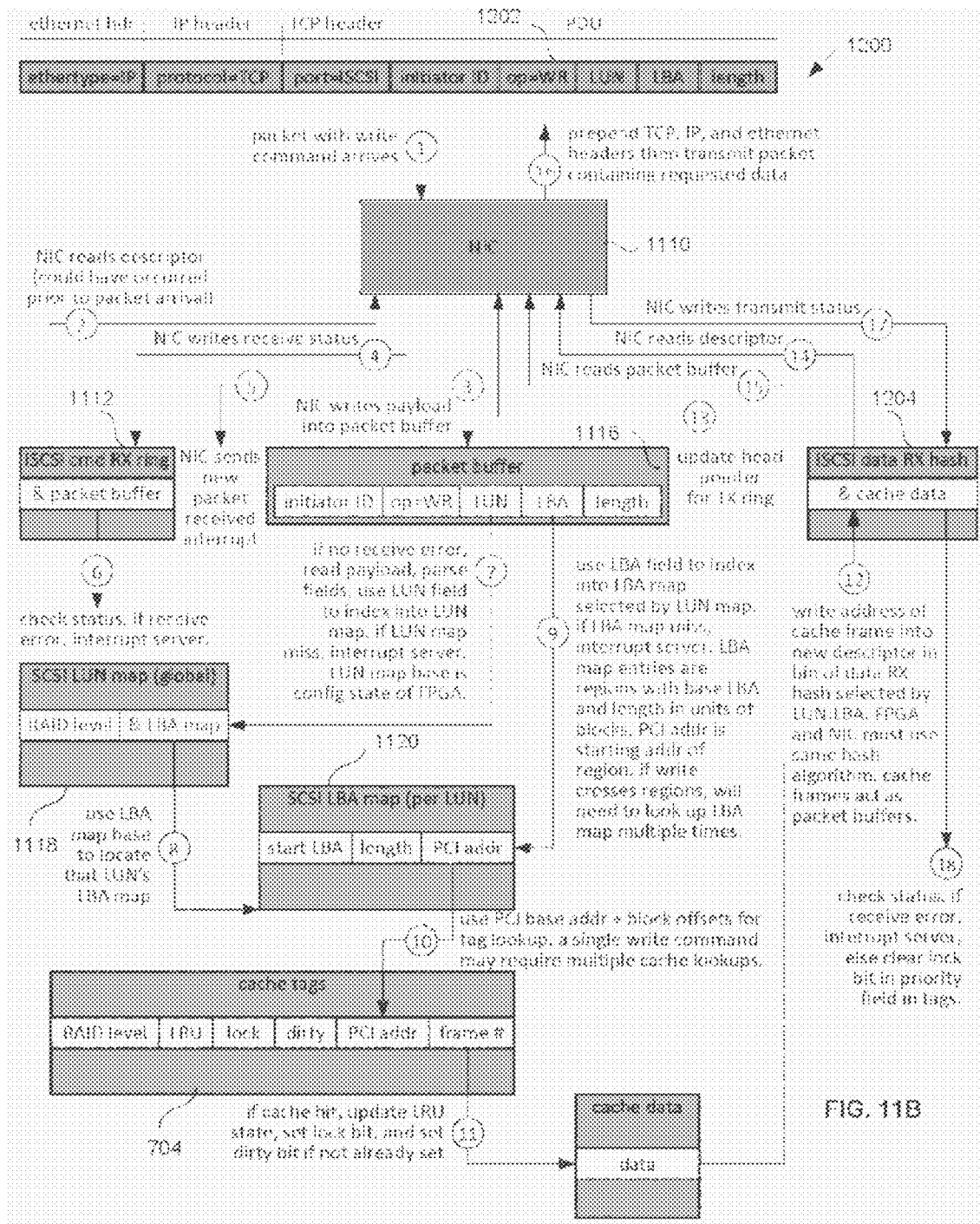
FIG. 11B is a block diagram illustrating data structures and order of operations related to processing a SCSI write command, according to an example embodiment.

FIG. 11B is a block diagram illustrating data structures and order of operations related to processing a SCSI write command, according to an example embodiment. An Ethernet packet 1200 including a write command 1202 arrives at the NIC 1110. Operations performed to fulfill a write request are similar to those for the read request disclosed in FIGS. 11A and 12. One difference is use of an iSCSI data receiver hash 1204 data structure instead of the iSCSI transmit ring 1114. The iSCSI data receiver hash 1204 is included in the FPGAs 350. Another difference is that data is written to cache modules 355 rather than reading from it.

FIGS. 11A-11B relate to TCP protocol-based data requests. TCP is a block level protocol. It is contemplated that read and write requests using other block level protocols can also be offloaded to the protocol offload engine 418 of the FPGAs 350. File level protocol-based read and write requests may also benefit from offloading to the FPGAs 350. Infini-Band, NFS, and the like are examples of other protocols contemplated.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the spirit and scope of the invention.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
a serial interconnect network that includes a plurality of serial data communication paths that interconnect endpoints including:
input/output (I/O) circuitry;
a first server configured to provide a root complex to enable enumeration of identifiers of the endpoints and to establish a peer-to-peer address space that includes address ranges associated with the enumerated identifiers of the endpoints;
an array of flash storage devices; and
an integrated circuit (IC) component coupled to a cache memory;
wherein the IC component is configured to translate addresses within data read and write requests that are sent from an external network and that are received by the I/O circuitry, between an address space used in the external network and the peer-to-peer address space, and wherein a cache control included in the IC component fulfills each of the data read and write requests using the peer-to-peer address space to access the cache memory coupled to the IC component before using the peer-to-peer address space to access the array of flash storage devices.

2. The system of claim 1, wherein the cache control stores data associated with each of the data write requests to the cache memory to fulfill each of the data write requests.

3. The system of claim 2, wherein the cache control waits to copy data written to the cache memory to the flash storage devices when the data write requests corresponding to the data written to the cache memory are associated with consecutive blocks of memory in the flash storage devices.

4. The system of claim 1, wherein the cache control retrieves data associated with each of the data read requests from the cache memory to fulfill each of the data read requests.

5. The system of claim 4, wherein the cache control retrieves data associated with the data read request from the flash storage devices if the data is unavailable in the cache memory.

6. The system of claim 5, wherein the cache control stores the data retrieved from the flash storage devices in the cache memory.

7. The system of claim 4, wherein the cache control checks presence of the data associated with each of the data read requests in the cache memory in a ternary content addressable memory (TCAM) coupled to the IC component, the TCAM including a cache table corresponding to the cache memory.

8. The system of claim 7, wherein the cache table includes an entry for each cache line of the cache memory storing data, the entry including a cache tag and one or more tracking metrics associated with the data stored in the cache line.

9. The system of claim 1, wherein the cache control maintains a capacity level of the cache memory at or below a pre-set maximum capacity level.

10. The system of claim 9, wherein the cache control removes certain data stored in the cache memory to maintain the capacity level at or below the pre-set maximum capacity level, the certain data selected in accordance with one or more pre-set eviction policies.

11. The system of claim 10, wherein at least one of the pre-set eviction policies comprises removing data having the least amount of write activity in the cache memory.

12. The system of claim 10, wherein at least one of the pre-set eviction policies comprises retaining data having a user-specified directive.

13. The system of claim 1, wherein the IC component comprises a field programmable gate array (FPGA).

14. The system of claim 1, wherein the IC component comprises an application specific integrated circuit (ASIC).

15. The system of claim 1,
wherein the cache control includes a receive data ring, a receive data ring and transmit data ring and one or more packet translation tables.

16. The system of claim 1,
wherein the cache control includes a receive command ring, a receive data ring and transmit data ring, at least one SCSI LUN map and at least one SCSI LBA maps.

17. The system of claim 1,
wherein the IC component includes a packet buffer; and
wherein the cache control includes a receive command ring, a receive data ring and transmit data ring, at least one SCSI LUN map and at least one SCSI LBA maps.

18. The system of claim 1,
wherein the serial interconnect network includes a PCIe network.

* * * * *